(12) United States Patent  
Ozawa et al.

(10) Patent No.: US 8,195,687 B2  
(45) Date of Patent: Jun. 5, 2012

(54) PROGRAM RETRIEVAL SUPPORT DEVICE FOR ACCUMULATING AND SEARCHING PIECES OF PROGRAM INFORMATION AND CORRESPONDING PROGRAMS AND A METHOD FOR PERFORMING THE SAME

(75) Inventors: Jun Ozawa, Nara (JP); Tsuyoshi Inoue, Nara (JP)

(73) Assignee: Panasonic Corporation, Osaka (JP)

( * ) Notice: Subject to any disclaimer, the term of this patent is extended or adjusted under 35 U.S.C. 154(b) by 201 days.

(21) Appl. No.: 12/517,403

(22) PCT Filed: Aug. 5, 2008

(86) PCT No.: PCT/JP2008/002106  
§ 371 (c)(1),  
(2), (4) Date: Jun. 3, 2009

(87) PCT Pub. No.: WO2009/019858  
PCT Pub. Date: Feb. 12, 2009

(65) Prior Publication Data  
US 2010/0094896 A1 Apr. 15, 2010

(30) Foreign Application Priority Data

Aug. 8, 2007 (JP) ................................. 2007-207214

(51) Int. Cl.  
*G06F 7/00* (2006.01)

(52) U.S. Cl. ......... 707/769; 707/603; 382/195; 348/563

(58) Field of Classification Search .................. 707/769, 707/603; 382/195; 348/563  
See application file for complete search history.

(56) References Cited

U.S. PATENT DOCUMENTS 5,726,702 A * 3/1998 Hamaguchi et al. ............ 725/55  
(Continued)

FOREIGN PATENT DOCUMENTS

| JP | 9-101951 | 4/1997 |
|---|---|---|
| JP | 11-025108 | 1/1999 |
| JP | 11-164217 | 6/1999 |
| JP | 2000-253325 | 9/2000 |
| JP | 2003-208444 | 7/2003 |
| JP | 2003-256471 | 9/2003 |
| JP | 2006-178599 | 7/2006 |
| JP | 2006-309364 | 11/2006 |

OTHER PUBLICATIONS

International Search Report issued Sep. 16, 2008 in the International (PCT) Application of which the present application is the U.S. National Stage.

*Primary Examiner* — Jean B Fleurantin  
*Assistant Examiner* — Mohammad Kabir  
(74) *Attorney, Agent, or Firm* — Wenderoth, Lind & Ponack, L.L.P.

(57) ABSTRACT

A program (e.g., tv/movie program) retrieval support device includes the following units. A program-information-accumulation unit (102) accumulating pieces of program information. A program-search-criterion-input unit (101) receiving from a user a search criterion. A program-information-search unit (103) searching the pieces of program information accumulated in the program-information-accumulation unit (102) using the received search criterion. A program-information-display unit (104) displaying a list of pieces of program information found by the search. A program-information-user-selection unit (105) receiving from the user an input of pointing (selecting) a piece of program information from the displayed pieces of program information. A program-search-criterion-generation unit (106) determining whether or not the pointed program is a major program and if the pointed program is a major program then generating new search criteria for narrowing down the search range to be more similar to the selected program. A program-search-criterion-display unit (107) displaying the generated new search criteria.

14 Claims, 30 Drawing Sheets

U.S. PATENT DOCUMENTS

| | | |
|---|---|---|
| 6,212,517 B1 | 4/2001 | Sato et al. |
| 7,464,086 B2 * | 12/2008 | Black et al. ............ 707/999.001 |
| 2003/0135497 A1 | 7/2003 | Mochizuki |
| 2003/0163462 A1 | 8/2003 | Kawamura |
| 2005/0149514 A1 * | 7/2005 | Tsuzuki et al. ........ 707/999.003 |
| 2005/0165739 A1 * | 7/2005 | Yamamoto et al. .... 707/999.003 |
| 2005/0209992 A1 * | 9/2005 | Kikinis et al. ......... 707/999.001 |
| 2007/0088683 A1 * | 4/2007 | Feroglia et al. ........ 707/999.004 |
| 2007/0214126 A1 * | 9/2007 | Kikinis .................. 707/999.003 |
| 2010/0135582 A1 * | 6/2010 | Gokturk et al. ............... 382/195 |
| 2010/0332503 A1 * | 12/2010 | Buckley et al. ............... 707/759 |

* cited by examiner

FIG. 4

| Please select search criterion. | | | |
|---|---|---|---|
| Genre | | | |
| sports | news | entertainment | music |
| variety show | documentary | drama | movie |

Channel

| 2 | 4 | 6 | 8 |
|---|---|---|---|
| 10 | 12 | 36 | 42 |

Next

FIG. 5

| Program ID | Program Recording Date | Program Start Time | Program End Time | Channel | Program Title | Genre | Program Content | Cast |
|---|---|---|---|---|---|---|---|---|
| 001 | 12 April | 17:00 | 17:55 | 4 | Banbino | drama | Shogo, who is introduced by Matsumoto mentioning "he is neither an orthodox hero nor an amiable person", is a university student working at an Italian restaurant in Hataka as a part-time worker. He is proud of his cooking skills and starts trained in a famous restaurant "Bakkanare" in Roppongi, Tokyo. But his pride is destroyed by the first-class staff members whom Shogo met there. Matsumoto said "I like to show you how he despaired completely and then still tried to do his upmost". | Shinsuke Shimata, Eiji Bantou, Yonesuke, Tsutomu Sekikon, Hikaru Ishuin |
| 002 | 12 April | 17:00 | 17:45 | 6 | Evening Five | news | Japan-China relationship on Chinese premier's visit in Japan / The double increase of female prisoners dramatically changes a prison to offer a good hospitality like a hotel? / A car driver watching just a moment of shoplifting, outrage 70-year old barricading in a toilet | Koue Un, Hiroko Okura, Shohei Fujishin, Hideya Sugio, Sadamitsu Morida, Kenhiro Iwai, Etsuko Kawasoe, Ayu Yamanai |
| 003 | 12 April | 19:00 | 21:20 | 8 | Professional Baseball | sports | Hiroshima Toyo Carps Vs. Yomiuri Giants at Hiroshima city ball stadium / Giants golden rookie Kanaha wishing the first victory for his deceased mother and Carps ace Kuroda will be starters? / big-time Giants offence, Yoshinobu, new 1st batter, and Tani and Ogasawara are must-see. | Tsutomu Hasekawa, Makoto Ishihashi, Etsuo Shinyu |
| 004 | 12 April | 18:00 | 18:50 | 8 | Adventure version laughing and holding laughing, Emergency all over the world! Tokoro also sorties! | variety show | Low Clearance Special, bite into South American ancient fish / Tokoro and Datsu found mysterious twins in a country of fire. / Takatoshi and Jikacho did (secret) comic dialogue using ultimate invention. / (secret) woman screaming swimming across the Amazon. / Men risking their lives for life saving, complete close-up of aviation rescue party | Tsugicho-Kacho, Takaandtoshi, Emi Wahisai, George Sho, Sanko Yamaoka |
| ⋮ | ⋮ | ⋮ | ⋮ | ⋮ | ⋮ | ⋮ | ⋮ | ⋮ |

FIG. 6

| Reproduction Navigation | Program List | | | | |
|---|---|---|---|---|---|
| | Date: 10 April<br>Time: 10:00~10:50<br>Title: Sports news | | | | |
| Browse | Date | Start Time | Channel | Title | Relevance |
| | 10 April | 10:00 | 2 | Sports news | 1 |
| | 10 April | 11:00 | 4 | Major league information | 1 |
| | 12 April | 10:30 | 8 | Soccer documentary | 1 |
| | 12 April | 8:00 | 2 | Digest Sports | 1 |
| | 12 April | 20:30 | 4 | Koshien Highlight | 1 |
| | 12 April | 19:00 | 6 | I love tennis | 1 |

FIG. 8

(a) Search Results of Genre="Sports" and their Keywords

| Program ID | Keyword |
|---|---|
| 001 | sports, baseball, Major League, Matsuzaka, ace, pitcher, |
| 003 | sports, Major League, America, southpaw, hitter, |
| 006 | sports, soccer, J League, |
| 009 | sports, tennis, Davis Cup, |
| 010 | sports, news flash, digest, |
| 025 | sports, high school, summer, Koshien, |
| 033 | sports, baseball, victory, Central League |
| 045 | sports, draft, baseball, |
| 046 | sports, baseball, Pacific League |
| ... | ... |

(b) Occurrence Frequency of Keywords of Search Results

| Keyword | Occurrence Frequency |
|---|---|
| sports | 181 |
| baseball | 82 |
| Yomiuri | 42 |
| Kyojin | 40 |
| Giants | 36 |
| Soccer | 30 |
| Victory | 21 |
| J League | 20 |
| Matsui | 18 |
| Digest | 12 |
| news flash | 12 |
| draft | 12 |
| ... | ... |

Search Result Basic Keywords

Selected Program Information

| Program ID | Program Recording Date | Program Start Time | Program End Time | Channel | Program Title | Genre | Program Content | Cast |
|---|---|---|---|---|---|---|---|---|
| 003 | 12 April | 19:00 | 21:20 | 8 | Sports News | sports | Hiroshima Toyo Carps Vs. Yomiuri Giants at Hiroshima city ball stadium / Giants golden rookie Kanaha wishing the first victory for his late mother and Carps ace Kuroda will be starters? / big-time Giants offence, Yoshinobu, new 1st batter, and Tani and Ogasawara are must-see. | Tsutomu Hasekawa, Makoto Ishihashi, Etsuo Shinyu |

Program Representative Keywords

| Keyword |
|---|
| sports |
| Hiroshima |
| Yomiuri |
| Giants |
| professional |
| rookie |
| Kuroda |
| starter |
| Ogasawara |
| . . . |

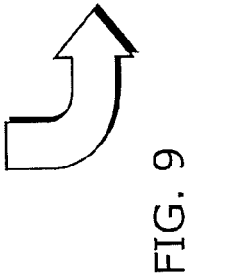

Search Result Basic Keywords

New Search Keywords
- Yomiuri
- Giants
- Hiroshima
- professional

The number of keywords having occurrence frequency greater than predetermined value in all search results is *.

Found data and selected program have the same tendency.

Next, narrow-down search is performed.

| Reproduction Navigation | Program List | | | | |
|---|---|---|---|---|---|
| | Date: 10 April  Time: 10:00~10:50  Title: Sports news | | | | Relevance Keywords |
| Browse | Date | Start Time | Channel | Title | Relev-ance |
| | 10 April | 10:00 | 2 | Sports news | 1 |
| | 10 April | 11:00 | 4 | Major league information | 1 |
| | 12 April | 10:30 | 8 | Soccer documentary | 1 |
| | 12 April | 8:00 | 2 | Digest Sports | 1 |
| | 12 April | 20:30 | 4 | Koshien Highlight | 1 |
| | 12 April | 19:00 | 6 | I love tennis | 1 |

Relevance Keywords:
- Yomiuri * sports
- Giants
- Hiroshima * sports
- professional * sports
- rookie * sports
- Kuroda * sports

FIG. 19

Reproduction Navigation — Program List

Date: 10 April
Time: 10:00~10:50
Title: Sports news

| Browse | Date | Start Time | Channel | Title | Relevance |
|---|---|---|---|---|---|
| | 10 April | 10:00 | 2 | Sports news | 1 |
| | 10 April | 11:00 | 4 | Major league information | 1 |
| | 12 April | 10:30 | 8 | Soccer documentary | 1 |
| | 12 April | 8:00 | 2 | Digest Sports | 1 |
| | 12 April | 20:30 | 4 | Koshien Highlight | 1 |
| | 12 April | 19:00 | 6 | I love tennis | 1 |

Relevance Keywords:
- Yomiuri * sports
- Giants
- Hiroshima * sports
- professional * sports
- rookie * sports
- Kuroda * sports Tow programs can be selected.

FIG. 22

| | Search Criterion Keyword | Found Program ID | Number of Found Programs |
|---|---|---|---|
| K001 | sports | P001, P003, P008, P021, ... | 122 |
| K002 | baseball | P001, P004, P009, P021, ... | 89 |
| K003 | Matsui | P001, P008, P009, P022, ... | 12 |
| K004 | golf | P003, P008, P018, P019, ... | 25 |
| ... | ... | ... | ... |

(a) Start Time of Search Result of Genre="sports"

| Program ID | Broadcast Start Time |
|---|---|
| 001 | from 19:00 |
| 003 | from 19:30 |
| 006 | from 19:00 |
| 009 | from 18:30 |
| 010 | from 19:30 |
| 025 | from 21:00 |
| 033 | from 18:00 |
| 045 | from 7:00 |
| 046 | from 19:30 |
| ... | ... |

(b) Program Number (Occurrence Frequency) for each Start Time Zone

| Start Time Zone | Program Number |
|---|---|
| 0:00-2:00 | 0 |
| 2:00-4:00 | 0 |
| 4:00-6:00 | 0 |
| 6:00-8:00 | 1 |
| 8:00-10:00 | 2 |
| 10:00-12:00 | 1 |
| 12:00-14:00 | 0 |
| 14:00-16:00 | 3 |
| 16:00-18:00 | 12 |
| 18:00-20:00 | 21 |
| 20:00-22:00 | 15 |
| 22:00-24:00 | 0 |

Search Result Basic Time Zones: 16:00-18:00, 18:00-20:00, 20:00-22:00

FIG. 29

(a) Selected Program Information

| Program ID | Program Recording Date | Program Start Time | Program End Time | Channel | Program Title | Genre | Program Content | Cast |
|---|---|---|---|---|---|---|---|---|
| 003 | 12 April | 19:30 | 20:00 | 8 | Sports News | sports | Hiroshima Toyo Carps Vs. Yomiuri Giants at Hiroshima city ball stadium / Giants golden rookie Kanaha wishing the first victory for his late mother and Carps ace Kuroda will be starters? / big-time Giants offence, Yoshinobu, new 1st batter, and Tani and Ogasawara are must-see. | Tsutomu Hasekawa, Makoto Ishihashi, Etsuo Shinyu |

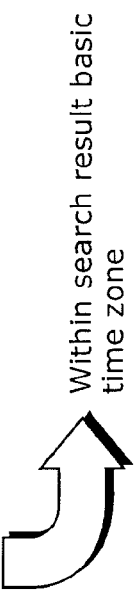

Within search result basic time zone ⇨ Further search within basic time zone (b) Selected Program Information

| Program ID | Program Recording Date | Program Start Time | Program End Time | Channel | Program Title | Genre | Program Content | Cast |
|---|---|---|---|---|---|---|---|---|
| 045 | 11 April | 7:00 | 7:30 | 4 | Every Morning Sports | sports | | |

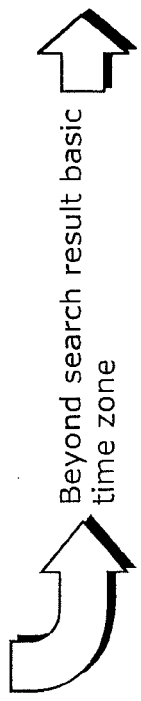

Beyond search result basic time zone ⇨ Present search criteria from a different viewpoint

FIG. 30

(a) When program determined as major program is selected

Reproduction Navigation

Program List (Sports)

Date : 10 April
Time : 10:00~10:50
Title : Sports News

| Browse | Date | Start Time | Channel | Title | Rele-vance |
|---|---|---|---|---|---|
| | 10 April | 10:00 | 2 | Sports News | 1 |
| | 10 April | 11:00 | 4 | Major league information | 1 |
| | 12 April | 10:30 | 8 | Soccer documentary | 1 |
| | 12 April | 8:00 | 2 | Digest Sports | 1 |
| | 12 April | 20:30 | 4 | Koshien Highlight | 1 |
| | 12 April | 19:00 | 6 | I love tennis | 1 |

Narrow-Down Criteria:
- 16:00-18:00
- 18:00-20:00
- 20:00-22:00

User move cursor by arrow key on remote controller.

Next search criteria are different.

(b) When program not determined as major program is selected

Reproduction Navigation

Program List (Sports)

Date : 12 April
Time : 8:00~8:50
Title : Table Tennis Special

| Browse | Date | Start Time | Channel | Title | Rele-vance |
|---|---|---|---|---|---|
| | 10 April | 10:00 | 2 | Digest Sports | 1 |
| | 10 April | 11:00 | 4 | Koshien Highlight | 1 |
| | 12 April | 10:30 | 8 | I love tennis | 1 |
| | 12 April | 8:00 | 2 | Table Tennis Special | 1 |
| | 12 April | 20:30 | 4 | Baseball Boys | 1 |
| | 12 April | 19:00 | 6 | Sports Navi | 1 |

Relevance Keywords:
- Table Tennis
- practice
- national champion

Genre:
- drama
- hobby
- Music

PROGRAM RETRIEVAL SUPPORT DEVICE FOR ACCUMULATING AND SEARCHING PIECES OF PROGRAM INFORMATION AND CORRESPONDING PROGRAMS AND A METHOD FOR PERFORMING THE SAME

TECHNICAL FIELD

The present invention relates to a terminal that searches for a content represented by a program or the like.

BACKGROUND ART

In recent years, with the popularization of digital broadcasting, various broadcast programs (e.g., tv/movie programs) have been provided. Further, the wide use of Electronic Program Guides (EPGs) has allowed users to check programs scheduled to be provided on television screens. Furthermore, as reproduction devices for hard disks and Digital Versatile Discs (DVDs) have been widely used, programs can be more easily recorded.

Under the circumstances, a system has been disclosed to extract user's preference regarding television programs based on, for example, contents of reserved recording to a hard disk or the like or a browse history of programs, and thereby recommend further broadcast programs matching the user's preference (Patent Reference 1, for example). Furthermore, a device has been disclosed to select programs a user desires, using information indicating whether or not recorded programs have been browsed.

Patent Reference 1: Japanese Unexamined Patent Application Publication No. 11-164217
Patent Reference 2: Japanese Unexamined Patent Application Publication No. 2000-253325

DISCLOSURE OF INVENTION

Problems that Invention is to Solve

Unfortunately, there are situations where the user is not satisfied with the recommended programs.

Therefore, an object of the present invention is to provide a program retrieval support device enabling a user to easily know what kind of programs are accumulated and to decide from among the accumulated programs a program which the user desires to watch.

Means to Solve the Problems

In accordance with an aspect of the present invention for achieving the object, there is provided a program retrieval support device that supports searching accumulated programs (e.g., tv/movie programs) for a program, the program retrieval support device comprising: a program-information-accumulation unit in which pieces of program information each of which is regarding a corresponding program are accumulated; a search-criterion-input unit configured to receive from a user a search criterion for program search; a program-information-search unit configured to search the pieces of program information accumulated in the program-information-accumulation unit, using the search criterion received by the search-criterion-input unit; a program-information-display unit configured to display found pieces of program information in a list, the found pieces of program information being found by the search of the program-information-search unit; a program-information-user-selection unit configured to receive from the user an input of selecting a selection piece of program information from the found pieces of program information displayed by the program-information-display unit; a major-program-determination unit configured to determine whether or not a program of the selection piece of program information is a major program, by determining whether or not the selection piece of program information has a commonality with the found pieces of program information; a program-search-criterion-generation unit configured to generate a new search criterion for narrowing down the found pieces of program information to be more similar to the selection piece of program information, when the major-program-determination unit determines that the program of the selection piece of program information is the major program; and a program-search-criterion-display unit configured to display the new search criterion generated by the program-search-criterion-generation unit so as to be used as a search criterion candidate having a possibility of being received by the search-criterion-input unit as a search criterion for further program search.

With the above structure, the program retrieval support device enables a user to easily find a desired program using dialogical interaction with the device even if a great number of programs are accumulated.

Effects of the Invention

As obvious from the above explanation, the program retrieval support device according to the present invention enables a user to check pieces of program information (hereinafter, referred to also simply as "programs") accumulated for a great number of program contents, only by selecting one of search criteria presented by a system, without generating a search criterion. Therefore, the program retrieval support device according to the present invention is highly suitable for practical use.

It should be noted that the present invention can be implemented not only as the above program retrieval support device, but also implemented in a television set, a video recorder, a personal computer, a DVD recording apparatus, or a Hard Disk Drive (HDD) recording apparatus. It is also possible to implement the present invention as: a program retrieval support method having steps performed by the characteristic units of the above program retrieval support device; a program, recorded on a non-transitory computer-readable recording medium, causing a computer to execute the steps; and an Integrated Circuit (IC) such as a Large Scale Integration (LSI).

BRIEF DESCRIPTION OF DRAWINGS

FIG. 4 is a diagram showing an example of a situation where a user inputs a search criterion for program search using a program-search-criterion-user-input unit.

FIG. 5 is a diagram showing an example of pieces of program information accumulated in a program-information-accumulation unit.

FIG. 6 is a diagram showing an example of a situation where pieces of program information are displayed in a table when a genre "sports" is selected as a search criterion by the program-search-criterion-user-input unit of FIG. 4.

FIG. 8 (a) is a table showing an example of search results when "sports" is selected as a search criterion from the genres shown in FIG. 4, for example. FIG. 8 (b) is a table showing an example of (i) keywords included in the pieces of program information of the search results shown in FIG. 8 (a) and (ii) occurrence frequency of each keyword in the all search results, which are arranged in an order of the occurrence frequency.

FIG. 9 is a diagram showing an example of a situation where keywords such as "sports", "Hiroshima", and "Yomiuri" are extracted as program representative keywords from a text of description of a program having a program ID 003 when the program is pointed.

FIG. 11 (b) is a diagram showing an example of search criteria displayed when a piece of program information regarding a program not determined as a major program is pointed from the program list generated by searching using the genre "sports".

FIG. 15 (b) is a diagram showing an example of generating keywords using AND combination of two keywords when a part of a set of search results obtained using keywords extracted from a piece of program information of a program pointed by a user is not included in a set of search results obtained using keywords received by the program-search-criterion-user-input unit.

FIG. 16 is a diagram showing an example of displaying search criteria when new search criteria are generated by AND combination of search criteria.

FIG. 17 is a diagram showing an example of a method for determining whether or not a selected program is a major program by comparing (i) a feature vector indicating (i-1) a search result set obtained using a genre or the like from (i-2) a whole program set (ii) a feature vector indicating (ii-1) a search result set obtained using a search criterion extracted from a piece of program information of a program pointed by a user from (ii-2) the search result set obtained using the genre or the like.

FIG. 19 is a diagram showing an example of determining whether or not selected programs are major programs when the user selects two programs.

FIG. 22 is a table showing an example of a history of search criteria accumulated in a program-search-criterion-input-history-accumulation unit.

FIG. 28 (b) is a table showing how many programs that are search results obtained using the genre "sports" are included in each broadcast start time zone.

FIG. 29 (a) is a table showing an example of search criteria when a programs pointed from among search results obtained using a genre "sports" is included in a search result basic time zone. FIG. 29 (b) is a diagram showing an example of search criteria when the program pointed from among the search results obtained using the genre "sports" is not included in a search result basic time zone.

FIG. 30 (a) is a diagram showing an example of search criteria presented when a broadcast start time of a pointed program is included in a search result basic time zone. FIG. 30 (b) is a diagram showing an example of search criteria presented when a broadcast start time of any pointed programs is not included in a search result basic time zone.

Figure 1:
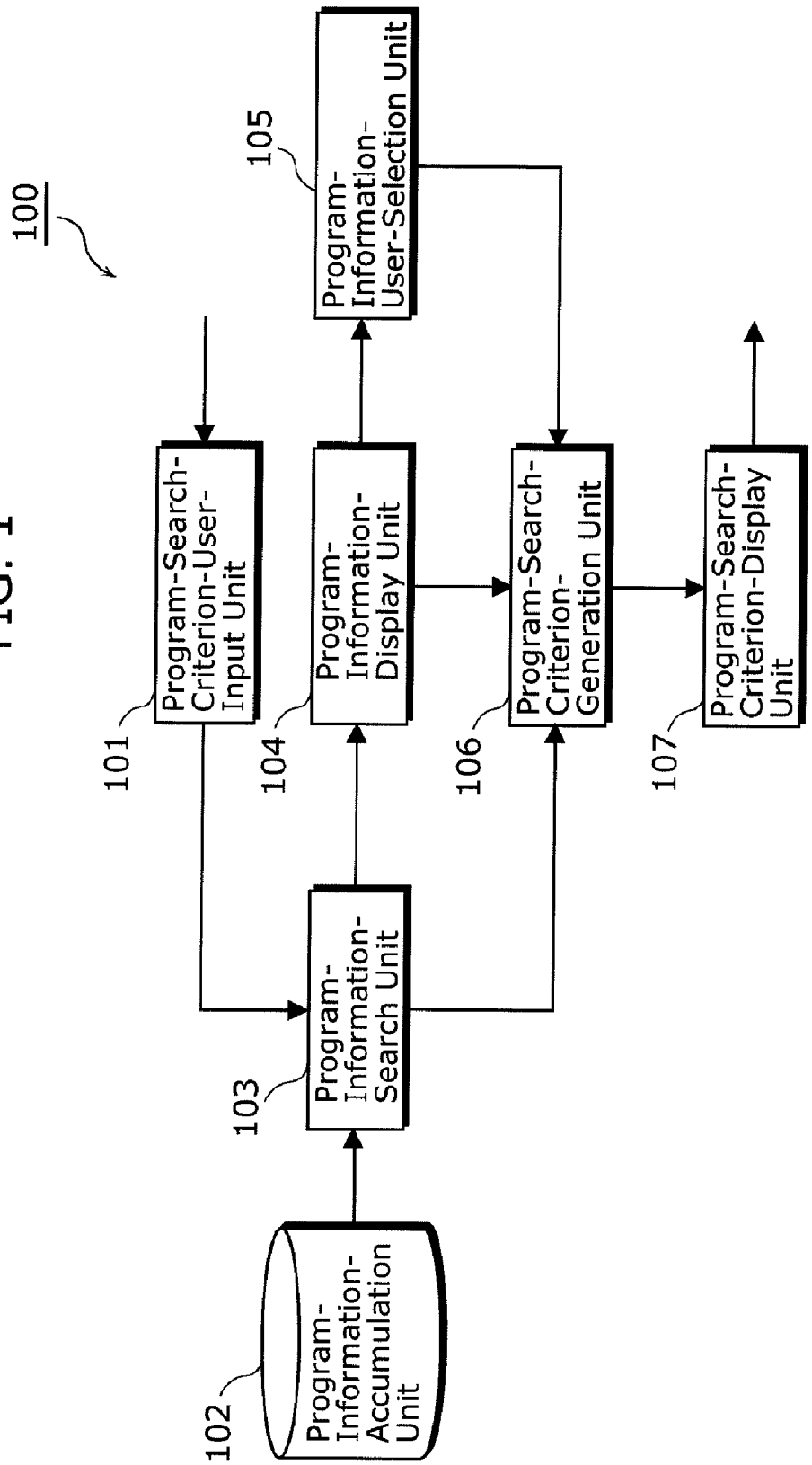
FIG. 1 is a block diagram showing a structure of a program retrieval support device according to a first embodiment.

NUMERICAL REFERENCES 100, 1800 program retrieval support device
101 program-search-criterion-user-input unit
102 program-information-accumulation unit
103 program-information-search unit
104 program-information-display unit
105 program-information-user-selection unit
106, 700, 1300, 2000 program-search-criterion-generation unit
107 program-search-criterion-display unit
201 remote-controller-code-transmission circuit
202 remote-controller-code-receiving circuit
203 receiving-tuner circuit
204 video-file-conversion circuit
205 metadata-conversion circuit
206 hard disk
207 arithmetic-operation circuit
208 main memory
209 liquid-crystal-display device
701 search-result-keyword-extraction unit
702 search-result-basic-keyword-decision unit
703 program-representative-keyword-extraction unit
704 major-program-determination unit
705 search-criterion-keyword-decision unit
706 program-information-search unit
707 program-search-criterion-display unit
708 program-information-user-selection unit
1301 set-inclusion-relation-calculation unit
1302 search-criterion-keyword-combination-decision unit
1801 program-search-criterion-input-history-accumulation unit
2001 search-result-set-generation-unit
2002 set-inclusion-relation-calculation unit

BEST MODE FOR CARRYING OUT THE INVENTION

The following describes embodiments of the present invention with reference to the drawings.

(First Embodiment)

FIG. 1 is a block diagram showing a structure of a program retrieval support device according to a first embodiment. The program retrieval support device 100 shown in FIG. 1 firstly determines whether or not a program (e.g., tv/movie program) pointed by a user (in other words, a program pointed using a cursor) has data for narrowing down listed programs to find a specific program. Here, the listed programs are obtained by searching a great number of accumulated programs using a keyword. Then, the program retrieval support device 100 displays (i) search criteria for the narrowing down and (ii) information for extending a search range if necessary. As a result, the program retrieval support device 100 can support the user to narrow down the search range to find the specific program. The program retrieval support device 100 includes a program-search-criterion-user-input unit 101, a program-information-accumulation unit 102, a program-information-search unit 103, a program-information-display unit 104, a program-information-user-selection unit 105, a program-search-criterion-generation unit 106, and a program-search-criterion-display unit 107. The program-search-criterion-user-input unit 101 is an example of "a search-criterion-input unit that receives from a user a search criterion for program search" in the aspect of the present invention. The program-information-accumulation unit 102 is an example of "a program-information-accumulation unit in which pieces of program information each of which is regarding a corresponding program are accumulated" in the aspect of the present invention. The program-information-search unit 103 is an example of "a program-information-search unit that searches the pieces of program information accumulated in the program-information-accumulation unit, using the search criterion received by the search-criterion-input unit" in the aspect of the present invention. The program-information-display unit 104 is an example of "a program-information-display unit that displays found pieces of program information in a list, the found pieces of program information being found by the search of the program-information-search unit" in the aspect of the present invention. The program-information-user-selection unit 105 is an example of "a program-information-user-selection unit that receives from the user an input of selecting a selection piece of program information from the found pieces of program information displayed by the program-information-display unit" in the aspect of the present invention. The program-search-criterion-generation unit 106 is an example of "a major-program-determination unit that determines whether or not a program of the selection piece of program information is a major program, by determining whether or not the selection piece of program information has a commonality with the found pieces of program information" and "a program-search-criterion-generation unit that generates a new search criterion for narrowing down the found pieces of program information to be more similar to the selection piece of program information, when the major-program-determination unit determines that the program of the selection piece of program information is the major program" in the aspect of the present invention. The program-search-criterion-display unit 107 is an example of "a program-search-criterion-display unit that displays the new search criterion generated by the program-search-criterion-generation unit so as to be used as a search criterion candidate having a possibility of being received by the search-criterion-input unit as a search criterion for further program search" in the aspect of the present invention.

Figure 2:
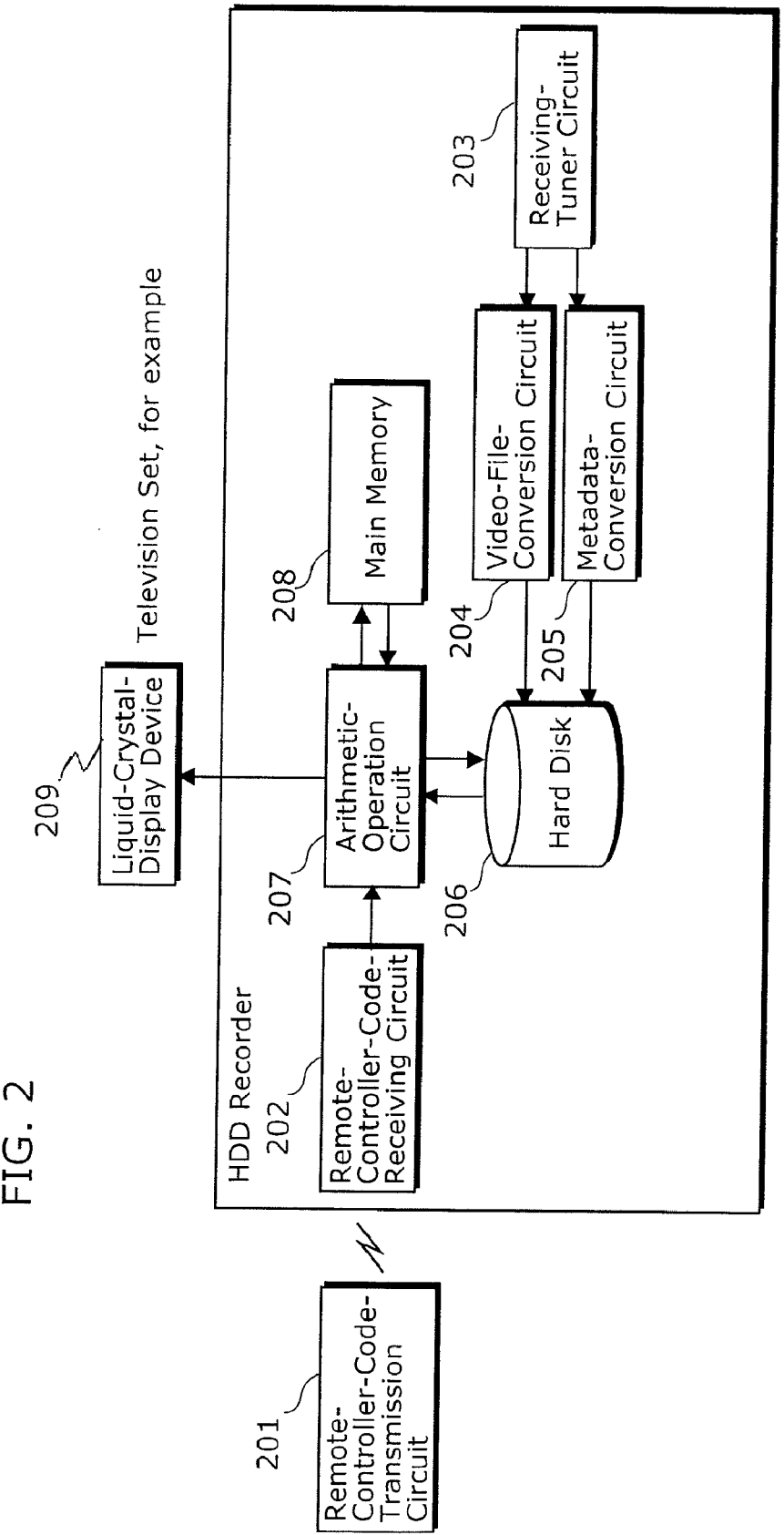
FIG. 2 is a block diagram showing a structure of a hardware for implementing the program retrieval support device of FIG. 1.

FIG. 2 is a block diagram showing a hardware structure for implementing the program retrieval support device 100 of FIG. 1. As shown in FIG. 2, the program retrieval support device 100 includes a remote-controller-code-transmission circuit 201, a remote-controller-code-receiving circuit 202, a receiving-tuner circuit 203, a video-file-conversion circuit 204, a metadata-conversion circuit 205, a hard disk 206, an arithmetic-operation circuit 207, and a main memory 208. The remote-controller-code-transmission circuit 201 transmits a user's intent of searching or an operation on a displayed screen to the device by radio such as infrared light. The remote-controller-code-receiving circuit 202 receives a predetermined code of a remote controller from the remote-controller-code-transmission circuit 201. The receiving-tuner circuit 203 receives a program content and program table information which are distributed from a broadcast station. The video-file-conversion circuit 204 is a circuit that converts signals received by the receiving-tuner circuit 203 to a movie file using processing such as Digital Signal Processing (DSP). The metadata-conversion circuit 205 is a circuit that converts program metadata regarding a broadcast time, description, and the like of the program content which are received by the receiving-tuner circuit 203 to codes. In the hard disk 206, the data converted by the video-file-conversion circuit 204 and the metadata-conversion circuit 204 are accumulated. The arithmetic-operation circuit 207 performs the processing instructed by the user's operation received by the remote-controller-code-receiving circuit 202, and performs processing using the metadata accumulated in the hard disk 206. The main memory 208 has a memory region from which processing details of a computer program is read and to which temporal variables are stored when the arithmetic-operation circuit 207 performs an arithmetic operation. An example of the liquid-crystal-display device 209 is a television set. The liquid-crystal-display device 209 displays a result of the arithmetic operation of the arithmetic-operation circuit 207 on a display or the like.

A corresponding relation between the hardware structure of FIG. 2 and the system structure of FIG. 1 is explained below. The program-search-criterion-user-input unit 101 of FIG. 1 corresponds to the remote-controller-code-receiving circuit 202 of FIG. 2. The program-information-accumulation unit 102 of FIG. 1 corresponds to the hard disk 206 of FIG. 2. The program-information-search unit 103 of FIG. 1 searches data in the hard disk 206 of FIG. 2 using the arithmetic-operation circuit 207 of FIG. 2 and the main memory 208 of FIG. 2. The program-information-display unit 104 of FIG. 1 displays a result of an arithmetic operation performed by the arithmetic-operation circuit 207 of FIG. 2 and the main memory 208 of FIG. 2 on the liquid-crystal-display device 209 of FIG. 2. The program-information-user-selection unit 105 of FIG. 1 receives a selection input of the user by the remote-controller-code-receiving circuit 202 of FIG. 2. The program-search-criterion-generation unit 106 of FIG. 1 performs an arithmetic operation using the arithmetic-operation circuit 207 of FIG. 2 and the main memory 208 of FIG. 2. The program-search-criterion-display unit 107 of FIG. 1 displays a result of the arithmetic operation using the arithmetic-operation circuit 207 of FIG. 2 and the main memory 208 of FIG. 2 on the liquid-crystal-display device 209 of FIG. 2.

Figure 3:
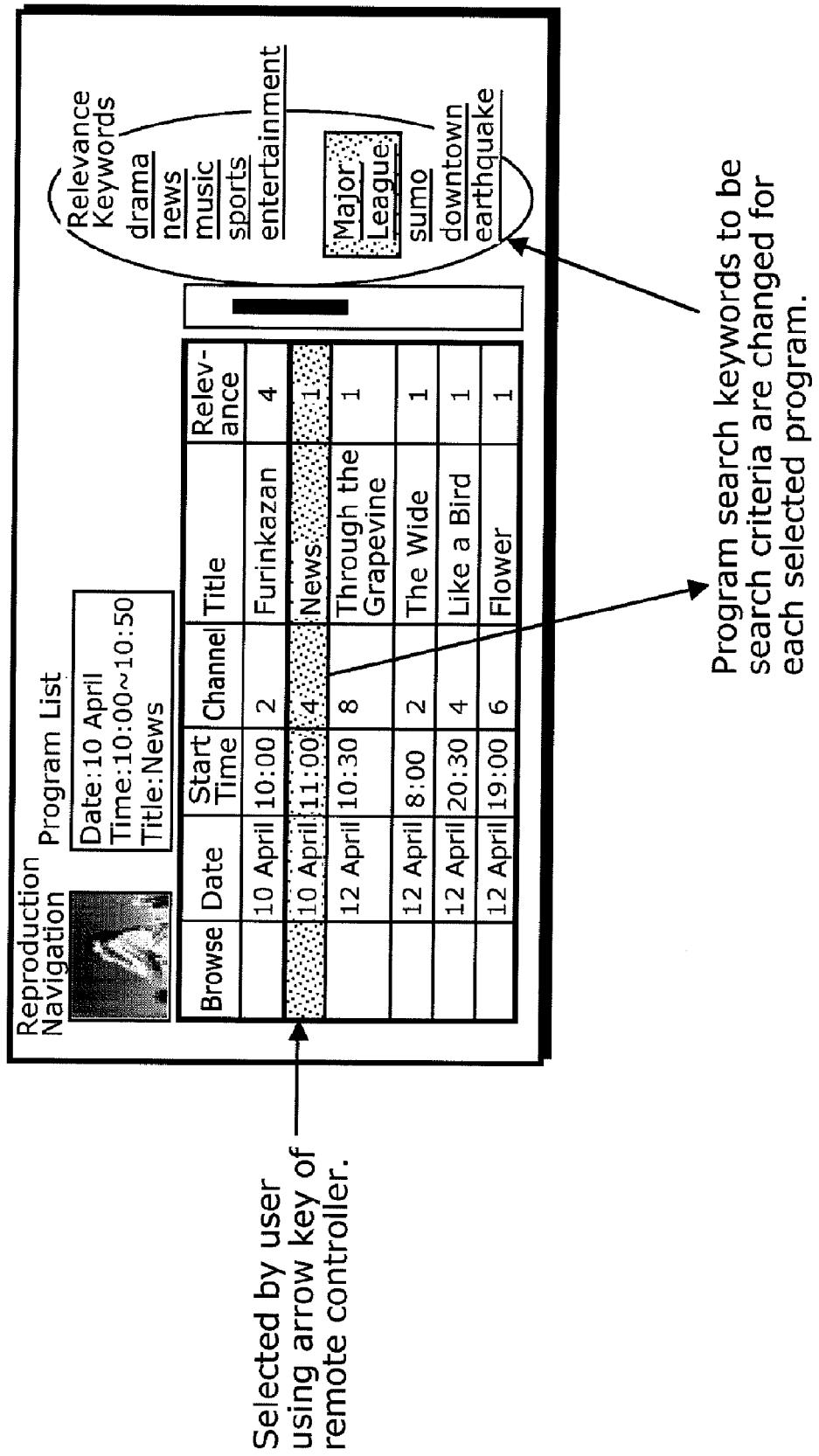
FIG. 3 is a diagram showing an example of a program search interface screen displayed by the program retrieval support device.

FIG. 3 is a diagram showing an example of a program search interface screen displayed by the program retrieval support device 100. In FIG. 3, results of user's searching accumulated program by a genre such as "news" are displayed in a table. A date of recording, a start time, a channel, a title, and the like of each program are displayed in the table. When the user selects a displayed recorded program using up/down keys on the remote controller, reproduction of the program starts. Furthermore, when each program is selected, keywords usable for next search are automatically displayed next to the table. When the user wishes to search for other programs except the program displayed in the table, the user selects one of the next search criteria displayed on the right side of the table, thereby further searching programs. For the next search criteria displayed on the screen, relevance keywords and keywords of other genres are dynamically changed to be displayed, being extracted from (i) text information of programs searched by the user and displayed in the table and (ii) text information of programs designated by the user using the remote controller. Therefore, when the user repeatedly selects one of the presented next search criteria, the user can easily check what kind of programs are accumulated. In addition, since the user does not need to generate keywords as search criteria for next search from the pieces of program information in the displayed table, the user can check programs being accumulated after another only by selecting next search criteria using the remote controller.

In general, when a program or the like to be searched for is predetermined, the program can be searched for by inputting a text of a name of the program in order to perform the search. However, when the user usually browses television in a free time, the user zaps channels one by one to search programs. Then, the user searches currently-broadcasting programs for a desired program. The search system according to the present invention performs such search processing in recorded programs. Especially in recent years, a storage capacity of a hard disk for recording has been increased, and a number of broadcast programs has also been increased. Therefore, the user is unlikely to record a certain program purposely, but uses a provided function of recording all new programs when a new season of broadcast programs starts, for example. Furthermore, a function of recording all programs of a certain time zone or a certain channel is also likely to be provided. As explained above, when too many programs are accumulated for the user to recognize even their titles, the user firstly examines what kind of programs are actually accumulated and then decide which programs are to be watched. The effective way of examining what kind of programs are accumulated is that the user inputs search criteria one by one to trace relevance programs currently presented. Therefore, the present invention realizes the function.

Next, the processing performed by the system of FIG. 1 is described for each unit.

An example of the program-search-criterion-user-input unit 101 is a key operation unit of a remote controller. The program-search-criterion-user-input unit 101 is used by the user to input a general search criterion such as a genre, a channel, or a keyword, in order to search accumulated programs. FIG. 4 is a diagram showing an example of a situation where the user inputs a search criterion for program search using the program-search-criterion-user-input unit 101. FIG. 4 shows an example of a situation where the user can input a search criterion such as "genre" or "channel" using a terminal such as a remote controller.

The program-information-accumulation unit 102 is a medium such as a hard disk in which metadata of program contents received by broadcast waves or a network is accumulated. In the program-information-accumulation unit 102, the program contents themselves (movie contents of the programs) are also accumulated. FIG. 5 is a diagram showing an example of pieces of information of programs (hereinafter, referred to as "pieces of program information") accumulated in the program-information-accumulation unit 102. In FIG. 5, a program record start date, a program start time, a channel, a title, text information regarding description of the program, names of actors/actresses or announcers as casts are accumulated for each program. These pieces of information are accumulated via various mediums and at various timings, by being presented to the user before broadcasting the program, by being distributed in synchronization with the program content, and by being obtained via a network after broadcasting the program, for example.

Using the search criterion inputted by the program-search-criterion-user-input unit 101, the program-information-search unit 103 searches the pieces of program information accumulated in the program-information-accumulation unit 102. The program-information-search unit 103 searches the pieces of program information accumulated in the program-information-accumulation unit 102, using, as a search criterion, (i) a search criterion regarding a broadcast station and a broadcast time of a desired program, (ii) a criterion regarding a genre such as "news" or "drama" of a desired program, (iii) a keyword included in description regarding a desired program, or the like. Then, the program-information-search unit 103 outputs pieces of program information found by the search (hereinafter, referred to also as "found pieces of program information"). The output of the program-information-search unit 103 may be only pieces of program information which can be displayed on a display device. For example, even if a large amount of text information regarding the found pieces of program description are accumulated in the program-information-accumulation unit 102, since it is impossible to display all of such text information on a screen, only a part of the text information corresponding to an available region on the screen is displayed.

The program-information-display unit 104 displays the pieces of program information found by the program-information-search unit 103 on a display device such as a liquid crystal display. FIG. 6 is a diagram showing an example of a situation where pieces of program information are displayed in a table when a genre "sports" is selected as a search criterion by the program-search-criterion-user-input-unit 101 of FIG. 4. Here, when the user operates up/down keys of the remote controller to point a program from the plural programs (hereinafter, referred to as a "program set") displayed in the table, (i) a still picture or a video as content description regarding the pointed program and (ii) information regarding the pointed program are displayed in the upper portion of the display part. Furthermore, when the user moves a cursor on the programs displayed in the table and operates a "select" function or the like of the remote controller to decide one of the programs, a content of the decided program which is actually accumulated in the program-information-accumulation unit is automatically reproduced.

The program-information-user-selection unit 105 receives instructions from the user to select (in other words, point) one of the programs displayed in the table by the program-information-display unit 104. For example, the program-information-user-selection unit 105 selects a program from the program table displayed in FIG. 6.

The program-search-criterion-generation unit 106 generates new search criteria for the user, using (i) the pieces of program information (programs) found by the search of the program-information-search unit 103, (ii) the pieces of program information displayed by the program-information-display unit 104, and (iii) the piece of program information selected by the program-information-user-selection unit 105. The program-search-criterion-generation unit 106 generates new search criteria, by determining an importance of the program selected by the program-information-user-selection unit 105 within the found program set that is a great number of pieces of program information found by the program-information-search unit 103. For example, when programs regarding sports are searched for and a result of the search is presented to the user, the user selects a program regarding "baseball" or "soccer" by the program-information-user-selection unit 105. In this case, there are many such programs (program contents) regarding "baseball" or "soccer" in the programs regarding "sports" (in other words, such programs are major programs in the programs regarding "sports"). Therefore, it is necessary to generate and present search criteria for narrowing down the search results. However, when the user selects a program regarding "table tennis" from the programs regarding the genre "sports", there are not so many such programs regarding "table tennis" in the programs regarding the genre "sports" (in other words, such programs are minor programs in the programs regarding "sports"). Therefore, it is necessary to generate different search criteria from a different point of view, rather than the search criteria for narrowing down the search results. Here, if the selected program is only one program found in the programs, it is necessary to guide the user to be interested in other targets to find different program contents.

Figure 7:
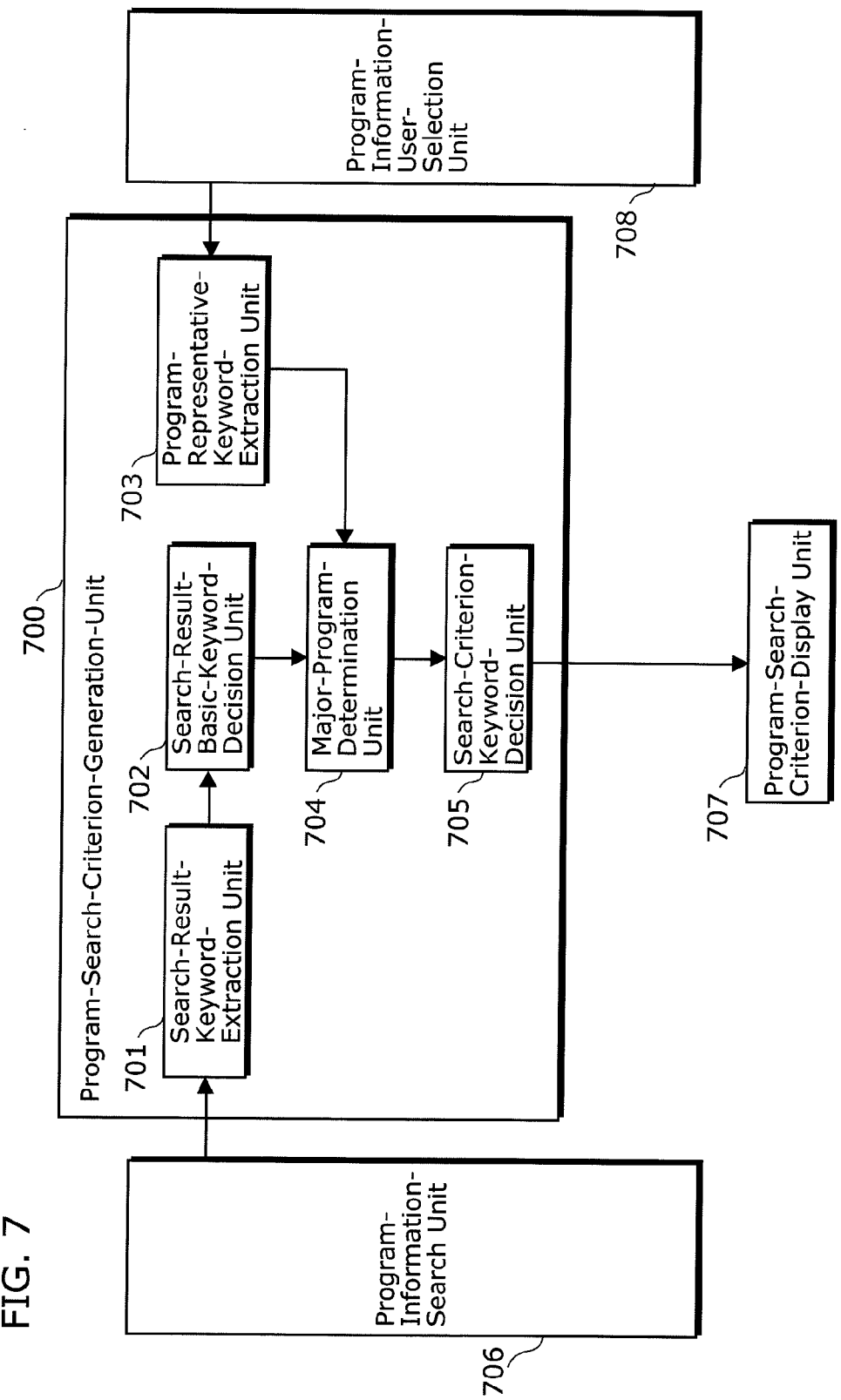
FIG. 7 is a block diagram showing a detailed structure of a program-search-criterion-generation unit of FIG. 1.

FIG. 7 is a block diagram showing a detailed structure of the program-search-criterion-generation unit 106 of FIG. 1. The program-search-criterion-generation unit 700 of FIG. 7 includes a search-result-keyword-extraction unit 701, a search-result-basic-keyword-decision unit 702, a program-representative-keyword-extraction unit 703, a major-program-determination unit 704, and a search-criterion-keyword-decision unit 705. The processing performed by each unit is described below.

The search-result-keyword-extraction unit 701 is an example of "a search-result-basic-keyword-extraction unit that extracts at least one search result keyword from pieces of text information in the found pieces of program information" in the aspect of the present invention. In the first embodiment, the search-result-keyword-extraction unit 701 extracts a bias of a program set using (i) the pieces of program information found by the program-information-search unit 706 and (ii) the pieces of program information (namely, search results) which are displayed by the program-information-display unit 104 and confirmed by the user. More specifically, the search-result-keyword-extraction unit 701 extracts keywords from pieces of text information of programs which are found by the program-information-search unit 706. In the keyword extraction, morpheme analysis is performed on the pieces of text information of description regarding the programs. Then, proper nouns, common nouns, and the like are extracted from the pieces of text information. FIG. 8 (*a*) is a table showing an example of search results when "sports" is selected as a search criterion from the genres shown in FIG. 4, for example. FIG. 8 (*b*) is a table showing an example of (i) keywords included in the pieces of program information that are the search results shown in FIG. 8 (*a*) and (ii) how many times each of the keywords appears in the all search results (hereinafter, referred to as "occurrence frequency"). The keywords and the occurrence frequencies are arranged in an order of the occurrence frequencies. As shown in FIG. 8 (*a*), each extracted keyword is stored in association with a corresponding program identification (ID). In this example, since the search criterion is "sports", then "sports" is extracted as a keyword for every program.

Based on the occurrence frequencies, the search-result-basic-keyword-decision unit 702 decides, as search result basic keywords, main keywords from among the keywords extracted by the search-result-keyword-extraction unit 701. For example, an occurrence frequency of each keyword is calculated regarding the found programs, and keywords having higher occurrence frequencies are decided as search result basic keywords. In the example of the program search results shown in FIG. 8, top 10 keywords having higher occurrence frequencies are decided as search result basic keywords as shown in FIG. 8 (*b*). However, if the search result basic keywords are set to keywords having higher occurrence frequencies, there is a situation where a general keyword, such as "program" or "time", which is included in any piece of program information and is not related to description regarding a certain program is extracted. Therefore, the search result basic keyword can be decided using not only such simple occurrence frequency but also a term frequency-inverse document frequency (TF-IDF) method or the like. Here, the search result basic keywords are keywords extracted from the programs currently displayed on the screen.

The program-representative-keyword-extraction unit 703 is an example of "a program-representative-keyword-extraction unit that extracts at least one program representative keyword from a piece of text information in the selection piece of program information" in the aspect of the present invention. From the program selected by the program-information-user-selection unit 105, the program-representative-keyword-extraction unit 703 extracts program representative keywords representing the description of the selected program. In more detail, the program-representative-keyword-extraction unit 703 extracts the program representative keywords by extracting proper nouns, common nouns, and the like from a text of the description regarding the selected program. FIG. 9 is a diagram showing an example of a situation where keywords such as "sports", "Hiroshima", and "Yomiuri" are extracted as program representative keywords from a text of description regarding of a program having a program ID 003 when the program is pointed.

The major-program-determination unit 704 is an example of "the major-program-determination unit determining that the program of the selection piece of program information is the major program, when the at least one search result keyword is included in the at least one program representative keyword, the at least one search result keyword appearing a predetermined number of times or more in the pieces of text information in the found pieces of program information" in the aspect of the present invention. The major-program-determination unit 704 determines whether or not the program selected by the program-information-user-selection unit 105 is a major program in a program set found by the program-information-search unit 103, using (i) the search result basic keywords decided by the search-result-basic-keyword-decision unit 702 and (ii) the program representative keywords extracted by the program-representative-keyword-extraction unit 703. In more detail, in order to determine whether or not the selected program is a major program, the major-program-determination unit 704 determines whether or not the number of the search result basic keywords included in the program representative keywords is equal to or more than a threshold value.

For example, in the examples of FIGS. 8 and 9, when the threshold value is three, if the number of the search result basic keywords of FIG. 8 included in the program representative keywords of FIG. 9 is three or more, the selected program is determined as a major program in the search results. In the example of FIG. 9, since the three search result basic keywords of "sports", "Yomiuri", and "Giants", are included in the program representative keywords, the selected program is determined as a major program.

It should be noted that it is also possible to determine the selected program as the major program, when the program representative keywords are arranged in order of the occurrence frequencies and if the number of search result basic keywords having predetermined higher positions in the order is equal to or more than a threshold value.

Figure 10:
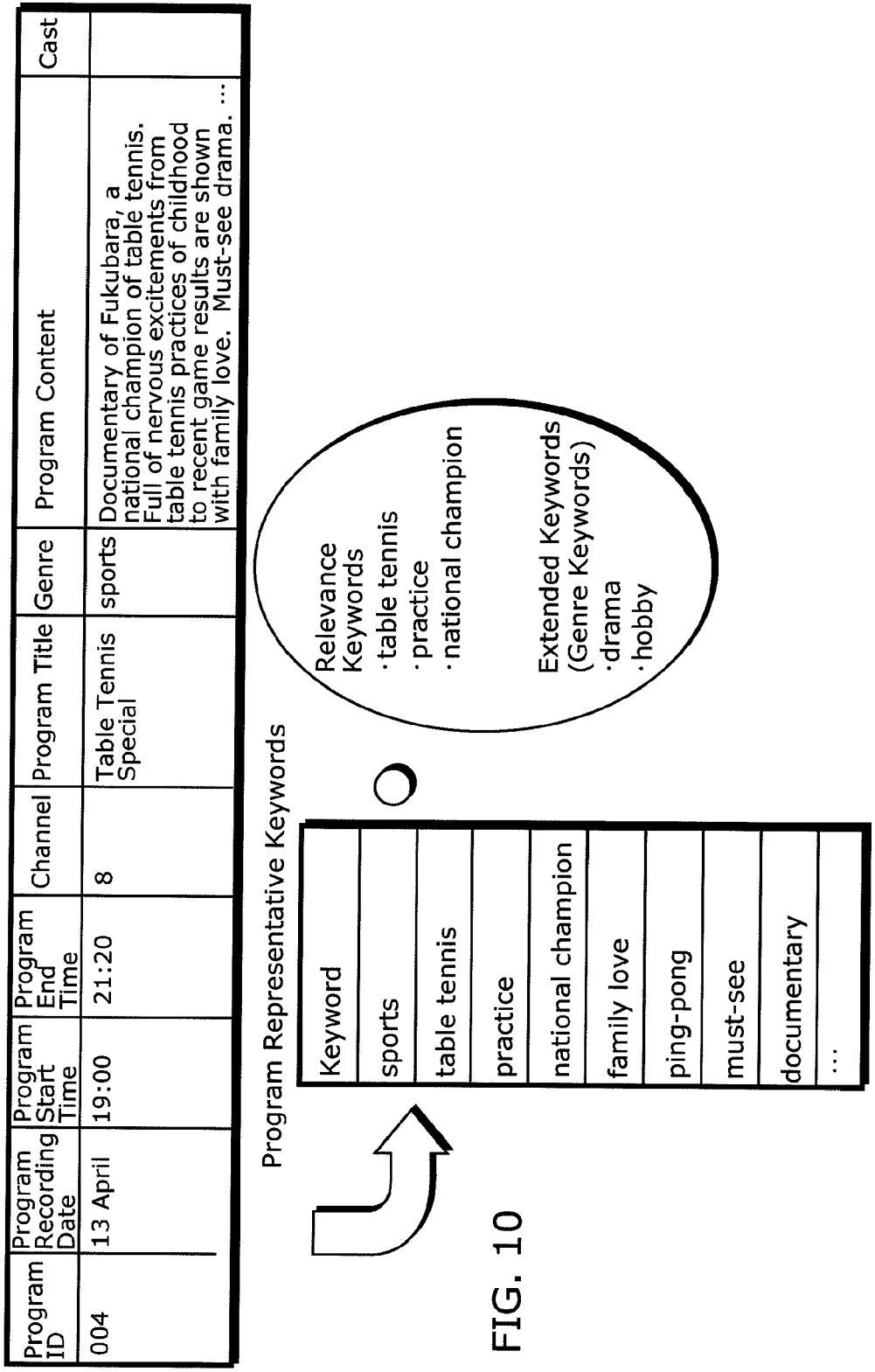
FIG. 10 is a diagram showing an example of a situation where keywords of other genres are presented together with relevance keywords when the number of search result basic keywords included in description regarding a program is not equal to or more than a threshold value.

The search-criterion-keyword-decision unit 705 is an example of "the program-search-criterion-generation unit that generates the new search criterion by extracting one of the at least one program representative keyword so as to be used as the search criterion candidate, when the major-program-determination unit determines that the program of the selection piece of program information is the major program" and an example of "the program-search-criterion-generation unit that generates (i) a keyword extracted from the at least one program representative keyword and (ii) a keyword regarding a genre different from a genre of the program of the selection piece of program information, when the major-program-determination unit determines that the program of the selection piece of program information is not the major program" in the aspect of the present invention. The search-criterion-keyword-decision unit 705 determines keywords as new search criteria using the result of the determination made by the major-program-determination unit 704. For example, if three of ten search result basic keywords are included in the description of the program selected by the user (in other words, if from among ten search result basic keywords the number of keywords included in the description of the selected program is equal to or more than three), keywords are extracted from the selected program and decided as search keywords for relevance programs. In the example of FIG. 9, keywords such as "Hiroshima", "Yomiuri", "Giants", "professional" and the like are extracted as relevance keywords of the selected program, and the extracted keywords are determined as new search criteria. On the other hand, if from among the ten search result basic keywords the number of keywords included in the description of the selected program is less than three, keywords for other genres such as "drama", "hobby", and the like are presented together with the relevance keywords. As explained above, if the program selected by the user is not a major program in the all found programs, there is a high possibility that the user is not satisfied with only the program. Therefore, the system of the present invention presents keywords of other genres to allow the user to search programs in other genres. An example of the above processing is shown in FIG. 10. FIG. 10 is a diagram showing an example of a situation where keywords of other genres are presented together with relevance keywords when the number of search result basic keywords included in description regarding a program is not equal to or more than a threshold value. This is because the program selected by the user is not a major program in the programs currently found or displayed and thereby if the user performs search using a different search criterion it is likely to find more relevance programs. On the other hand, when the user fails to find more programs even if using a different search criterion, the user can learn that not so many programs matching the user's desire are accumulated in the hard disk of the device. As explained above, repeating searches the user learns brief description of the programs accumulated in the hard disk and eventually finds out a desired program.

It should be noted that priorities of presenting keywords may be determined using prioritization decided according to the occurrence frequency of the program representative keywords, in order to assign a higher priority to a program having higher occurrence frequency or a higher TF-IDF value.

With reference to FIG. 10, the following describes a situation where a program pointed by the user is "Table Tennis Special" of FIG. 10 when keywords extracted by the search-result-keyword-extraction unit 701 are as shown in FIG. 8. If a program ID of the program shown in the example of FIG. 10 is a program 004, although the program is regarding "sports", keywords extracted from description of the program are assumed to be "table tennis", "practice", "national champion" and the like as well as "sports" as shown in FIG. 10. In this case, the extracted keywords include only one keyword regarding major programs shown in FIG. 8, which is the keyword "sports". Therefore, genre keywords such as "drama" and "hobby" which are keywords for other genres are also presented as new search criteria, together with relevance keywords such as "table tennis", "practice", and "national champion".

As described above, it is possible to determine whether or not the user needs to change the search criterion for narrowing down search results using a genre "sports", depending on a program selected by the user (in other words, a program pointed by moving a cursor using a remote controller). Depending on a result of the determination, next search criteria can be changed. This means that the user can perform appropriate program search only by selecting one of presented search criteria. In addition, as described above, search keywords of not only a major program but also a minor program are presented and thereby dialogical search is repeated. Thereby, it is also possible to extend user's interest before performing program search.

Figure 11:
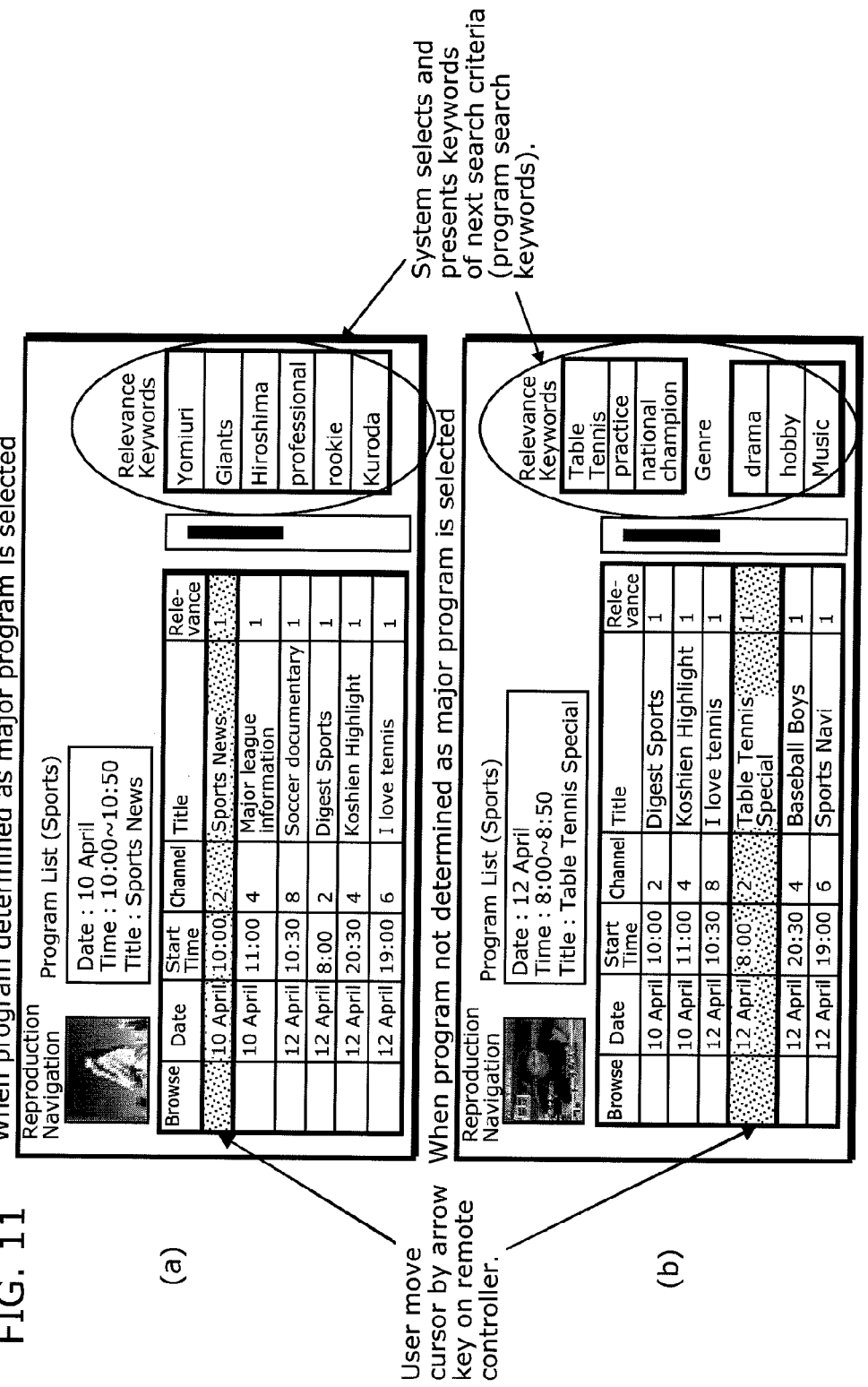
FIG. 11 (a) is a diagram showing an example of search criteria when a piece of program information regarding a program determined as a major program is pointed from a program list generated by searching using a genre "sports".

The program-search-criterion-display unit 107 presents the search criteria generated by the program-search-criteriongeneration unit 106 on a display or the like so that the user can select one of the displayed search criteria using a device such as a remote controller. An example of the display screen is shown in FIG. 11. FIG. 11 (*a*) is a diagram showing an example of search criteria when a piece of program information regarding a program determined as a major program is pointed from a program list generated by searching using a genre "sports". For example, when "Sports news" at the top of the program list is selected from the programs found using the genre "sports", relevance keywords are presented at the right-side portion of the screen. When one of the keywords is selected by a remote controller, programs including the selected keyword are searched for. On the other hand, FIG. 11 (*b*) is a diagram showing an example of search criteria when a piece of program information regarding a program not determined as a major program is pointed from the program list generated by searching using the genre "sports". For example, when the user points a program "Table Tennis Special" by moving a cursor using the remote controller, keywords for searching other genres are presented together with relevance keywords at the right-side portion of the screen. As described above, new search keywords are presented depending on a program selected by the user and the user selects one of the presented keywords. Thereby, it is possible to effectively search for programs different from the programs which are current search results.

Figure 12:
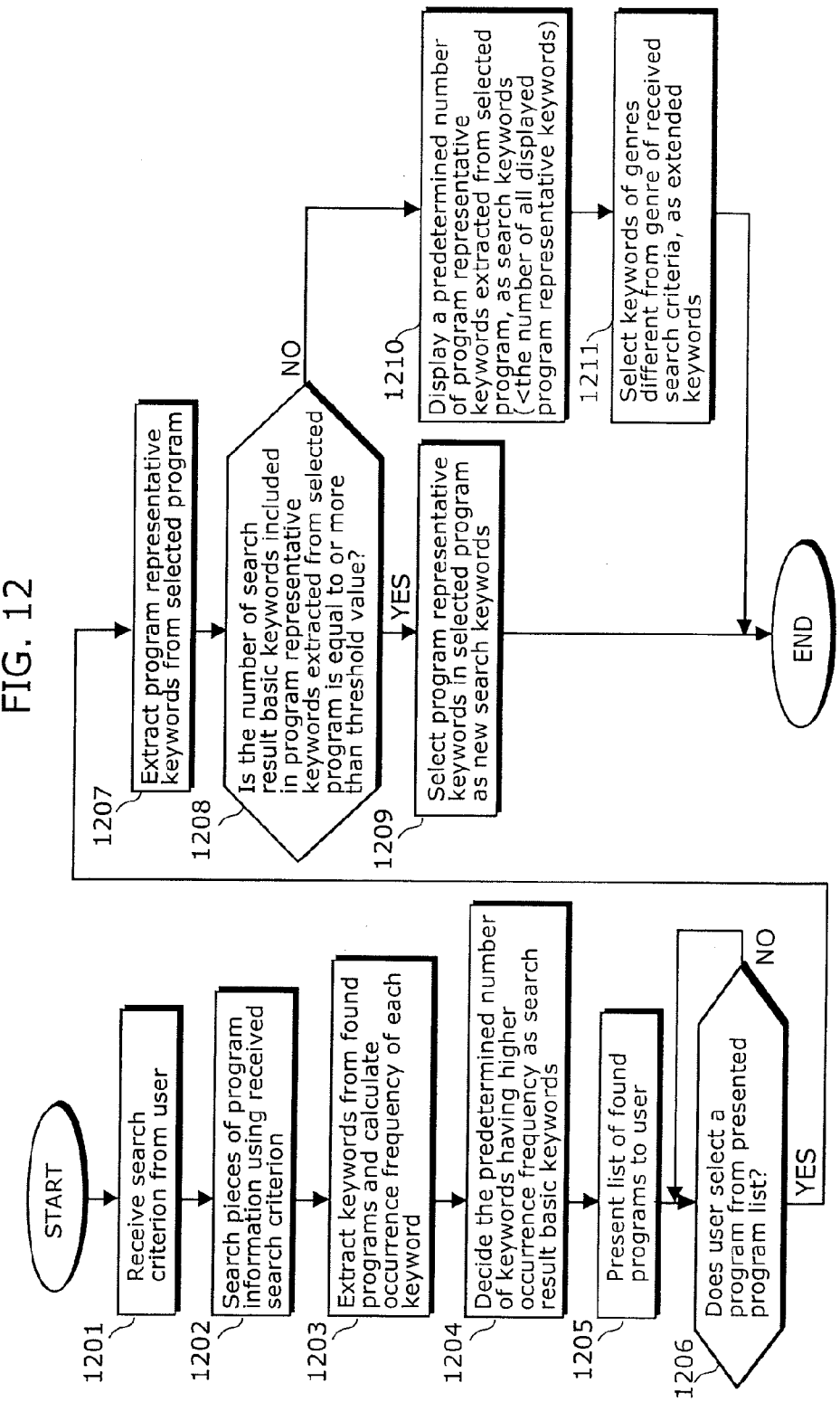
FIG. 12 is a flowchart of an example of processing performed by the program retrieval support device according to the first embodiment which generates search criteria depending on whether or not a program selected by a user is a major program.

The above processing is explained with reference to a flowchart of FIG. 12. FIG. 12 is a flowchart of an example of processing performed by the program retrieval support device according to the first embodiment to generate search criteria depending on whether or not a program selected by the user is a major program. Firstly, using the program-search-criterion-user-input unit 101 a search criterion is inputted on the input screen of FIG. 4 (Step 1201). In the example of FIG. 4, a genre "sports" is selected as a search criterion. Next, the program retrieval support device searches pieces of program information of FIG. 5 accumulated in the program-information-search unit 103 using the search criterion inputted by the program-search-criterion-user-input unit 101 (Step 1202). Then, keywords are extracted by the search-result-keyword-extraction unit 701 from programs found by the search, and occurrence frequency of each of the keywords is calculated (Step 1203). An example of the extracted keywords is shown in FIG. 8. Next, as search result basic keywords, the search-result-basic-keyword-decision unit 702 extracts the predetermined number of keywords sequentially from the above extracted keywords in an ascending order of occurrence frequency (Step 1204). The search results of the program-information-search unit 103 are presented as shown in FIG. 6 (Step 1205). This step S1206 is repeated until using the remote controller the user selects a program from the programs in a table which are presented search results (Step 1206). When in the program-information-user-selection unit 105 the user moves a cursor to select a program using the user's operating remote controller, the program-representative-keyword-extraction unit 703 extracts keywords from text information of the selected program (Step 1207). In the example of FIG. 9, keywords "sports", "Hiroshima", and the like are extracted as program representative keywords. The major-program-determination unit 704 determines whether or not the number of search result basic keywords included in the program representative keywords extracted from the selected program is equal to or more than a threshold value (Step 1208). In the example of FIG. 9, the threshold value is three and the number of the included search result basic keywords is three or more. Therefore, the processing proceeds to Step 1209. At Step 1209, the search-criterion-keyword-decision unit 705 selects, as relevance keywords to be search criteria, keywords included in the program selected by the user, and then the program-search-criterion-display unit 107 presents the selected keywords. On the other hand, if at Step S1208 the number of the included search result basic keywords is less than the threshold value, then the processing proceeds to Step 1210 and the program representative keywords are reduced to a predetermined number that is less than the number of the displayed program representative keywords (Step 1210). Next, for keywords regarding fields (genres) different from the field (genre) of the relevance keywords, keywords of other genres are presented as many as an available display region allows (Step 1211). As a result of the above processing, as shown in FIG. 11, next search criteria are presented every time a program is selected. Thereby, the user does not need to generate search keywords but the system automatically present the user with search keywords, when the user is not satisfied with programs found using a genre or when a great number of programs are found and the user wishes to narrow down the found programs. Therefore, all the user needs to do is selecting one of the keywords to easily find a program which the user is interested in.

(Modification of First Embodiment)

In the first embodiment, next search criteria as new search criteria are presented depending on a program selected by the user. Then, the user selects a keyword or keywords from the new search criteria to narrow down the found program set (the set of the found programs). However, as long as the search is performed using keywords, the narrowing down is not always successful even if a current keyword can express the user's desire more than a previous keyword. For example, it is assumed that, firstly programs are searched using a genre "sports", then a certain program is selected from programs found by the search, and eventually a keyword "Yomiuri" is presented as a relevance keyword. In this case, even if "Yomiuri" is selected, there are "Yomiuri" in the fields of sports and the fields of news. Therefore, when the user selects "Yomiuri" in the genre of sports, it is a possibility that programs are searched in a different genre and eventually further narrowing down is necessary.

Figure 13:
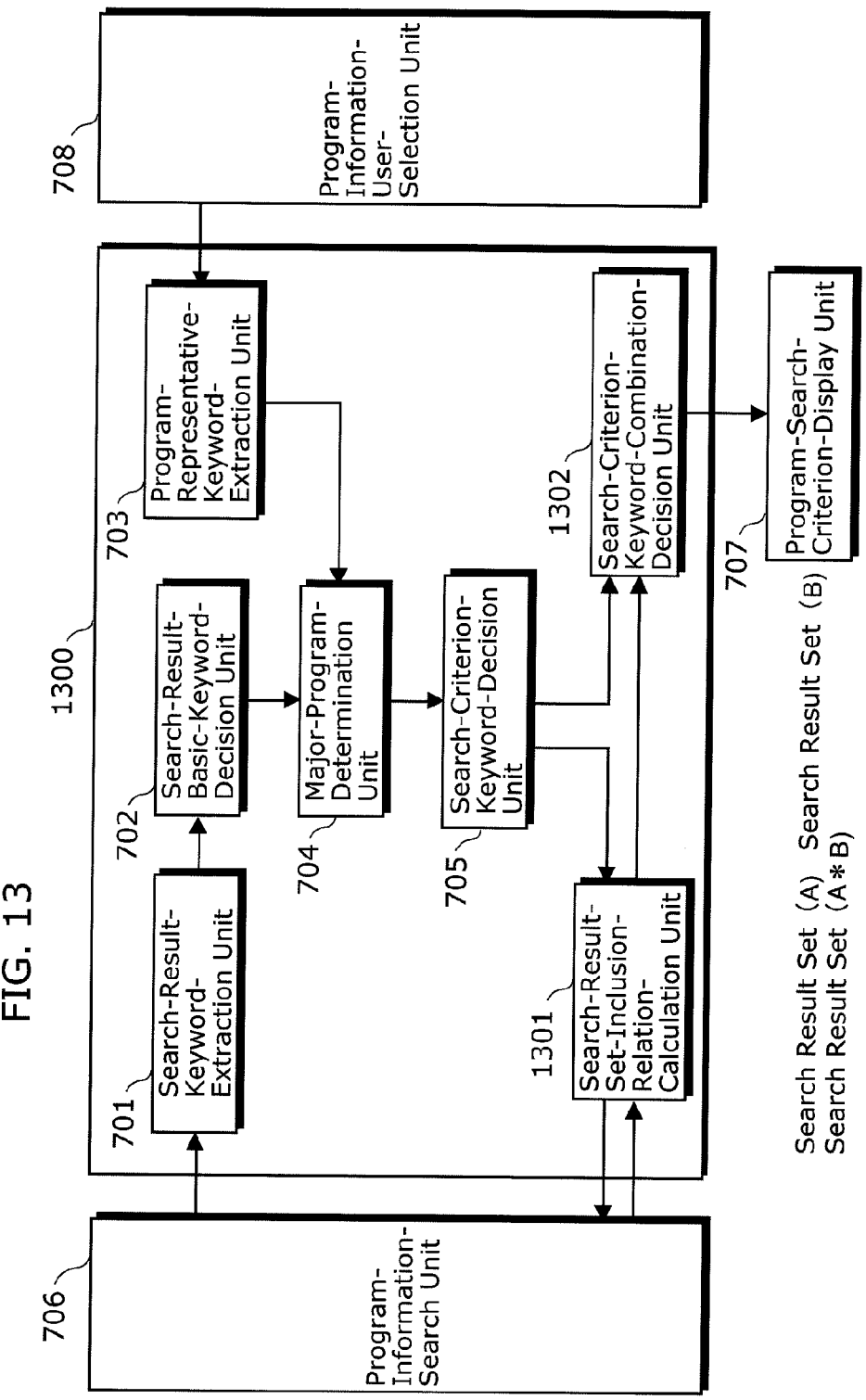
FIG. 13 is a block diagram showing a structure of the program-search-criterion-generation unit which is a modification of the first embodiment.

Therefore, in the modification of the first embodiment, an example of generating new search criteria by combining relevance keywords when the relevance keywords are to be used to narrow down is described. FIG. 13 is a block diagram showing a structure of the program-search-criterion-generation unit 1300 which is a modification of the first embodiment. Each of other units shown in FIG. 13 performs the same processing as the corresponding unit in FIG. 1. Moreover, the same reference numerals in the program-search-criterion-generation unit 700 of FIG. 7 are assigned to the identical units in the program-search-criterion-generation unit 1300 of FIG. 13, so that the identical units having the same functions are not explained again below.

Figure 14:
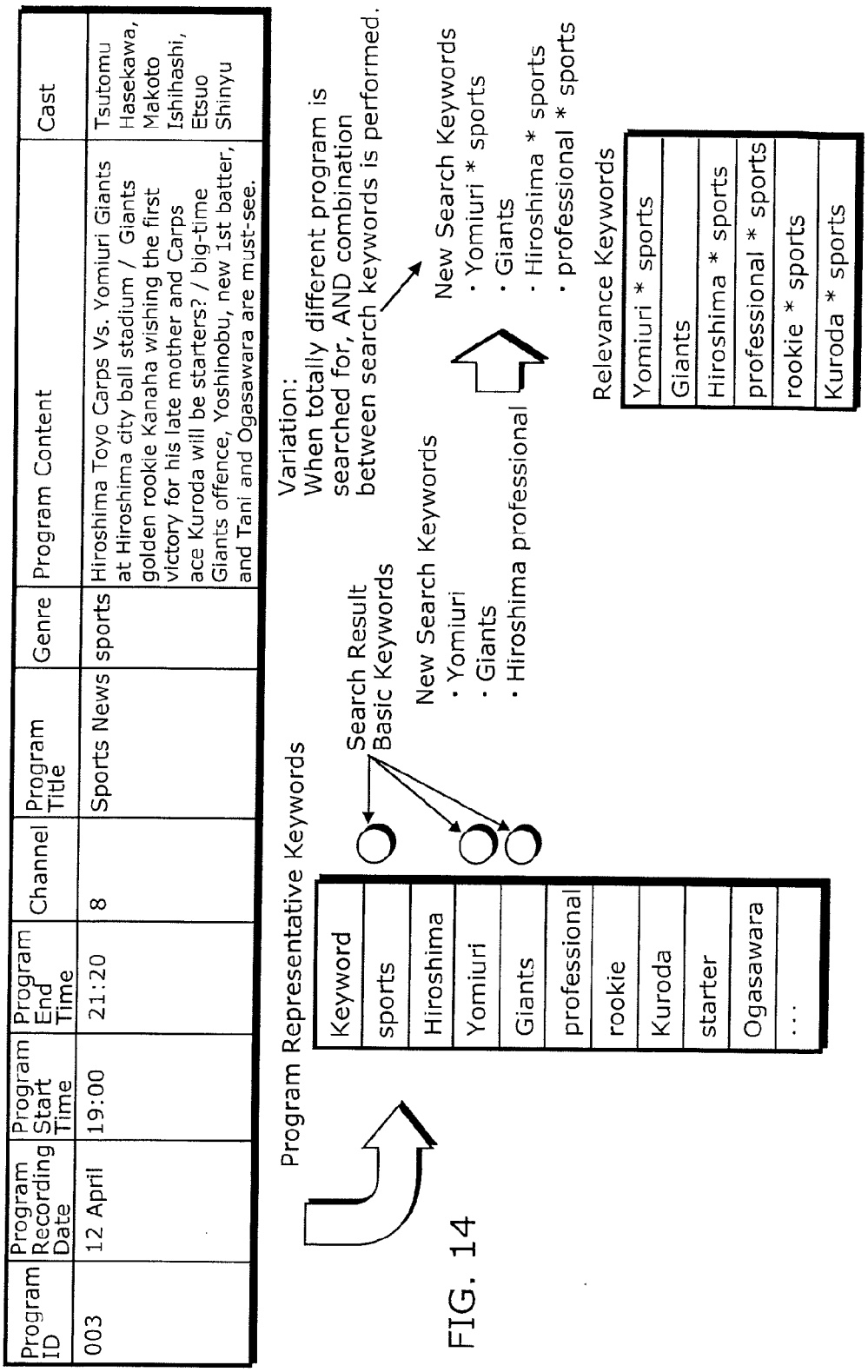
FIG. 14 is a diagram showing an example of displaying relevance keywords using AND combination when a program set obtained using keywords extracted from a piece of program information of a pointed program is not completely equal to a program set obtained using keywords inputted by the program-search-criterion-user-input unit.
Figure 15:
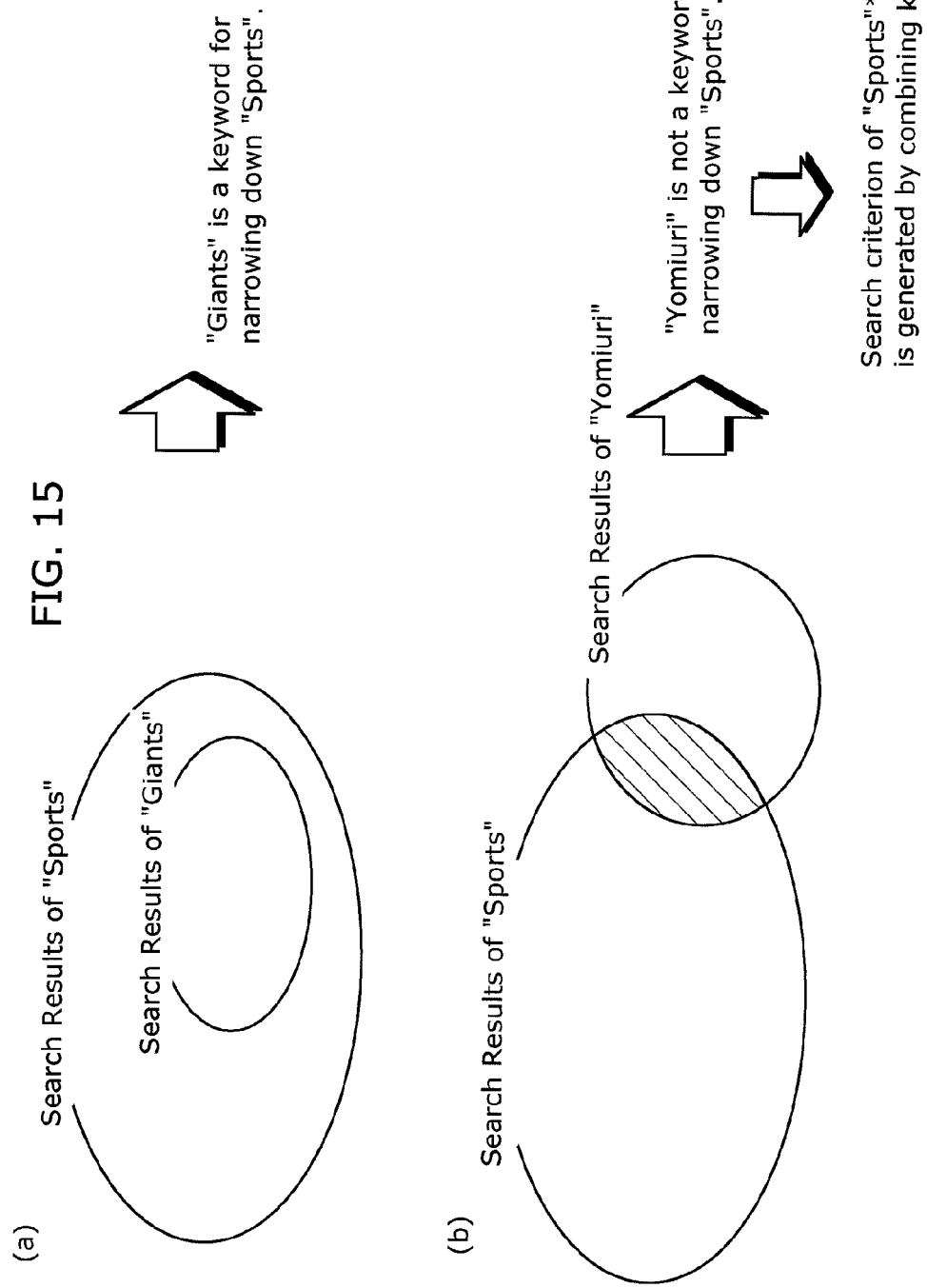
FIG. 15 (a) is a diagram showing an example of generating keywords when a set of search results obtained using keywords extracted from a piece of program information of a program pointed by a user is included in a set of search results obtained using keywords received by the program-search-criterion-user-input unit.

A set-inclusion-relation-calculation unit 1301 calculates an inclusion relation between (i) search results of search using the program representative keywords decided by the search-criterion-keyword-decision unit 705 and (ii) search results of search using a genre or a keyword inputted by the program-search-criterion-user-input unit 101. FIG. 14 is a diagram showing an example of displaying relevance keywords generated using AND combination when a program set obtained using keywords extracted from a piece of program information of a pointed program is not completely equal to a program set obtained using a keyword inputted by the program-search-criterion-user-input unit 101. For example, as shown in FIG. 14, it is assumed that a search criterion inputted by the program-search-criterion-user-input unit 101 is "sports", and that keywords "Yomiuri", "Giants", "Hiroshima", "professional", "rookie", "Kuroda", and the like are extracted as program representative keywords of a pointed program. Here, an inclusion relation between (i) a result of search using each of the program representative keywords and (ii) a result of search using "sports" is calculated. FIG. 15 is a diagram showing an example of generating search criteria for narrowing down a search range, depending on the inclusion relation between (i) a set of the search results using the search criterion inputted by the program-search-criterion-user-input unit 101 and (ii) a set of the search results using the search criteria extracted from the piece of program information of the program pointed by the user. FIG. 15 (a) is a diagram showing an example of generating a search criterion when the set of search results obtained using the search criteria extracted from the piece of program information of the program pointed by the user is included in the set of search results obtained using the search criterion inputted by the program-search-criterion-user-input unit 101. FIG. 15 (b) is a diagram showing an example of generating a search criterion using AND combination of two search criteria when a part of the set of search results obtained using the search criteria extracted from the piece of program information of the program pointed by the user is not included in the set of search results obtained using the search criterion inputted by the program-search-criterion-user-input unit 101. The search-criterion-keyword-combination-decision unit 1302 is an example of "the program-search-criterion-generation unit that generates the next search criterion using AND combination between the at least one search result keyword and the at least one program representative keyword, when (a) the major-program-determination unit determines that the program of the selection piece of program information is the major program and (b) the at least one program representative keyword is used to search a different genre" in the aspect of the present invention. More specifically, when the search result set obtained using "sports" and the search result set obtained using "Giants" have an inclusion relation with each other (in other words, the search result set obtained using "Giants" is included in the search result set obtained using "sports" as shown in FIG. 15 (a)), the search-criterion-keyword-combination-decision unit 1302 determines that the keyword "Giants" is an appropriate keyword for narrowing down programs (the search results) and displays a not-combined keyword. On the other hand, when the search result set obtained using "sports" and the search result set obtained using "Yomiuri" do not have an inclusion relation with each other as shown in FIG. 15 (b), the search-criterion-keyword-combination-decision unit 1302 generates a search criterion using AND combination of the keywords. This means that the keywords are combined using AND combination to be displayed as a next search criterion.

As a result, in the example of FIG. 14, if keywords except "Giants" from among "Yomiuri", "Giants", "Hiroshima", "professional", "rookie", and "Kuroda" do not have an inclusion relation with the search result set of "sports", search criteria are generated using AND combination of the keywords. The search-criterion-keyword-combination-decision unit 1302 determines whether or not search criteria are to be generated using AND combination of keywords as described above.

FIG. 16 is a diagram showing an example of displaying search criteria when new search criteria are generated by AND combination of search criteria. As shown in FIG. 16, the above-described processing makes it possible to generate new search criteria not only as program representative keywords each consisting a single keyword but also as combinations of search keywords for more effectively narrowing down programs. Quicker program narrowing down can be achieved because search is performed always using AND combination, for example. This search using AND combination is effective when intent of the user is clear and a program the user desires to watch is predetermined. However, when the user wishes to firstly check what kind of programs are accumulated in the hard disk and then decide which one is to be watched, the search using AND combination is not always successful in quickly narrowing down. For example, when the user does window-shopping for clothes, the user compares various items with one another and if a desired item is found the user decides to buy the item. In this case, user's purposes are not only to narrow down of the items, but also to browse various items. The present invention is a search system supporting the user to firstly check various programs accumulated in the hard disk and if an interesting program is found then watch the program, in the similar manner to the window-shopping.

Figure 17:
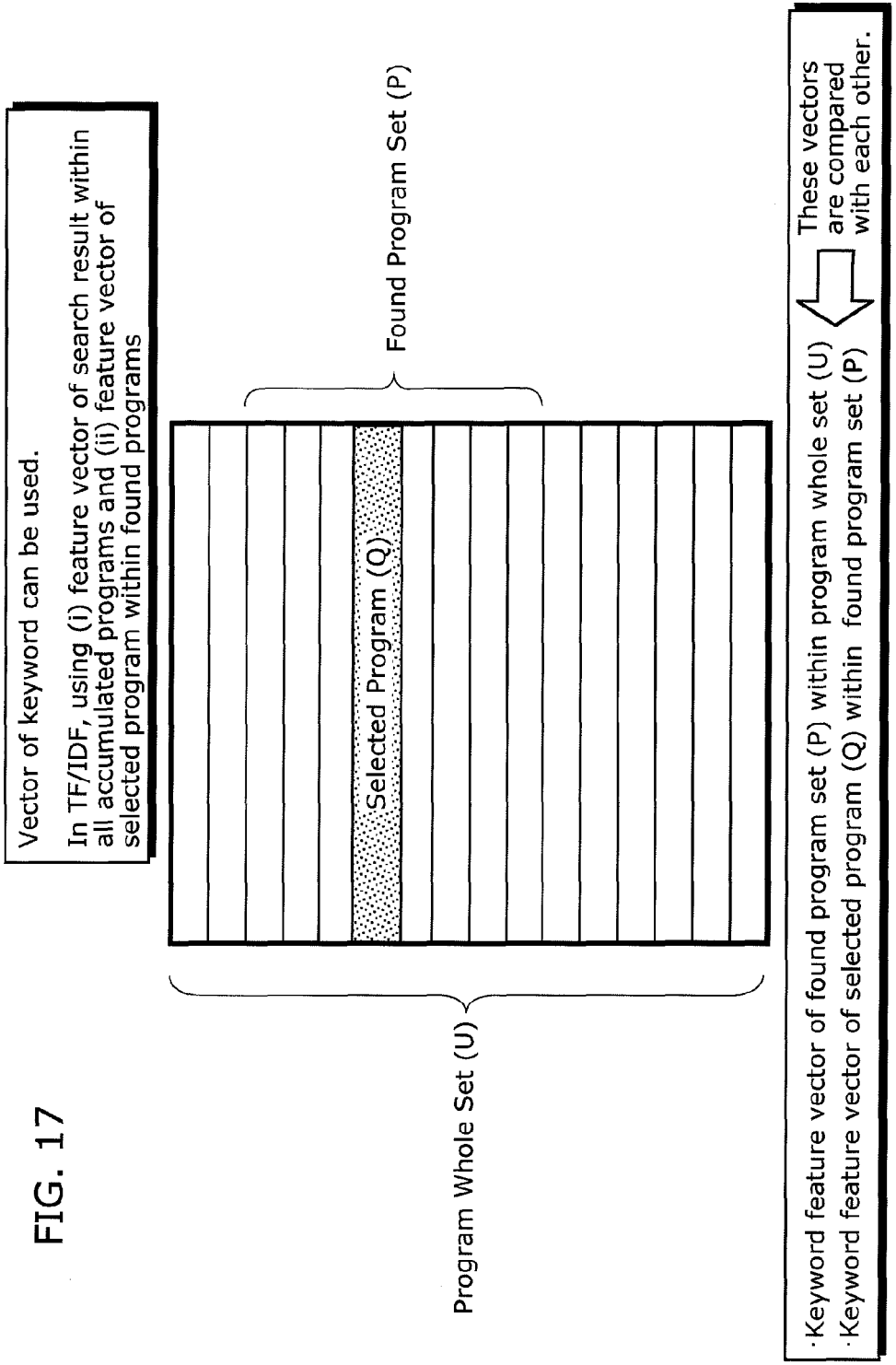

It should be noted that in the first embodiment a feature amount of a program is expressed by occurrence frequency of a keyword. However, it is also possible to generate a keyword vector expressing a set of search results (a search result set) using a TF-IDF value and then to determine based on a similarity in directions between keyword vectors whether or not a selected program is a major program. For example, FIG. 17 is a diagram showing an example of a method for determining whether or not a selected program is a major program by comparing (i) a feature vector indicating (i-1) a search result set obtained using a genre or the like from (i-2) a whole program set (all programs) with (ii) a feature vector indicating (ii-1) a search result set obtained using a search criterion extracted from the pointed program information from (ii-2) the search result set obtained using the genre or the like. Furthermore, as shown in FIG. 17, a feature amount of a weight of a keyword may be expressed using a TF-IDF value. Here, the major-program-determination unit 704 is an example of "the major-program-determination unit that determines whether or not the program of the selection piece of program information is the major program, using (i) a term frequency-inverse document frequency (TF-IDF) value of (i-1) a keyword included in the found pieces of program information within (i-2) the pieces of program information accumulated in the program-information-accumulation unit and (ii) a TF-IDF value of (ii-1) a keyword included in the selection piece of program information within (ii-2) the found pieces of program information" in the aspect of the present invention. For example, a keyword vector expressing search results of a set of pieces of program information regarding a genre "sports" is expressed by a feature vector of keywords in text data of a program set found using the genre "sports". Moreover, in order to express a keyword vector of a program selected by the user from found programs, a whole program set is set as the found programs and a feature vector of keywords of the program selected by the user is calculated. Then, using a difference in directions between these keyword vectors, it is possible to determine the program selected by the user is a major program in all of the found programs. Depending on a result of the determination, a keyword as a new search criterion can be selected.

It should also be noted that in the first embodiment it is determined whether or not a selected program is a major program using keywords as search criteria included in the program. In the meanwhile, a recorded program is assigned with information regarding a recording time (broadcast time), a recording date (broadcast date), and a recording channel (broadcast channel). Therefore, these recording information can be used to determine whether or not a selected program is a major program.

Figure 18:
FIG. 18 is a diagram showing an example of determining whether or not a selected program is a major program using information regarding a start time and a channel of the program.

FIG. 18 is a diagram showing an example of determining whether or not a selected program is a major program using information regarding a start time and a channel of the program. For example, as shown in FIG. 18, it is assumed that, when results of program search using a category "sports" are displayed on a screen, most of recorded programs are "Sports news" which is broadcast every day in the same time zone. It is also assumed that there is only one different program "Digest sports" among the recorded programs. In this case, "Sports news" is considered to be a major program which is majority in the found programs. On the other hand, "Digest sports" is not considered to be a major program in the found programs. The above determination can be made using recording information of the programs, not using text information of the programs.

In more detail, a recording start time of each "Sports news" is 10:00, and a recording start time of "Digest sports" is 8:00. Therefore, by comparing the program start times with one another, if from among the found programs a program starting at 10:00 is found predetermined times or more, then the program can be determined as a major program. On the other hand, it is possible to determine that the program starting at 8:00 is not a major program. Here, the major-program-determination unit 704 is an example of "the major-program-determination unit that determines whether or not the selection piece of program information has the commonality with the found pieces of program information, using date and time of broadcasting or recording the program of the selection piece of program information" in the aspect of the present invention.

As described above, it has been described in the first embodiment that keywords extracted from text information regarding a program are used to determine whether or not the program is a major program. However, it is also possible to use recording information of the program, such as information regarding recording start time and recording date of the program, in order to determine whether or not the program is a major program.

It is further possible to perform the same processing not only on recorded programs but also on programs scheduled to be broadcast, in order to determine whether or not a program selected by the user is a major program.

Figure 20:
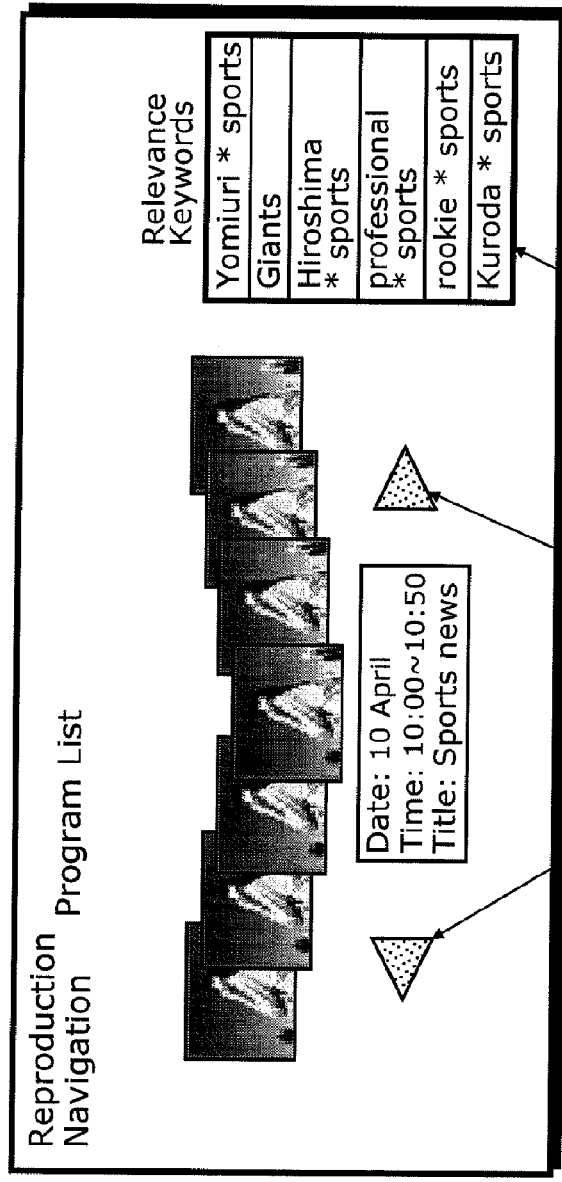
FIG. 20 is a diagram showing an example of a display screen for determining whether or not a program corresponding to an image displayed at the center of the screen is a major program, by associating each program included in a program list with each corresponding image.

It should be noted that it has described in the first embodiment that new search criterion candidates are displayed when the user selects one program from displayed programs. FIG. 19 is a diagram showing an example determining whether or not selected programs are major programs when the user selects two programs. Furthermore, as shown in FIG. 19, in a case where the user uses a pointing device or the like to select two programs, new search information can be generated by determining whether or not the selected two programs are major programs. Still further, the following interface can also achieve the same. FIG. 20 is a diagram showing an example of a display screen for determining whether or not a program corresponding to an image displayed at the center of the display screen is a major program, by associating each program included in a program list with each corresponding image. Thereby, the above case can produce the same effects as the case where the user selects or points a program from the program list. In FIG. 20, there is no clear relevance between the programs in the program list and the displayed images. However, if each image shows a characteristic scene of a corresponding program, for example, the interface enables the user to easily perform search visually.

(Second Embodiment)

The program retrieval support device according to the first embodiment generates and displays search criteria (keywords) for getting to a program which the user prefers more from a program pointed by the user, when the user points the program (program information) from pieces of program information found by selecting a genre. The second embodiment describes the following program retrieval support device. The program retrieval support device according to the second embodiment accumulates a history of user's selection of keywords which have been presented as search criteria. Then, using an inclusion relation between sets of programs as search results obtained using the user's selected keywords, the program retrieval support device according to the second embodiment determines whether the user attempts to narrow down the search results or the user attempts to search for a program of a different genre. Then, the program retrieval support device considers a result of the determination to present next search criteria.

Figure 21:
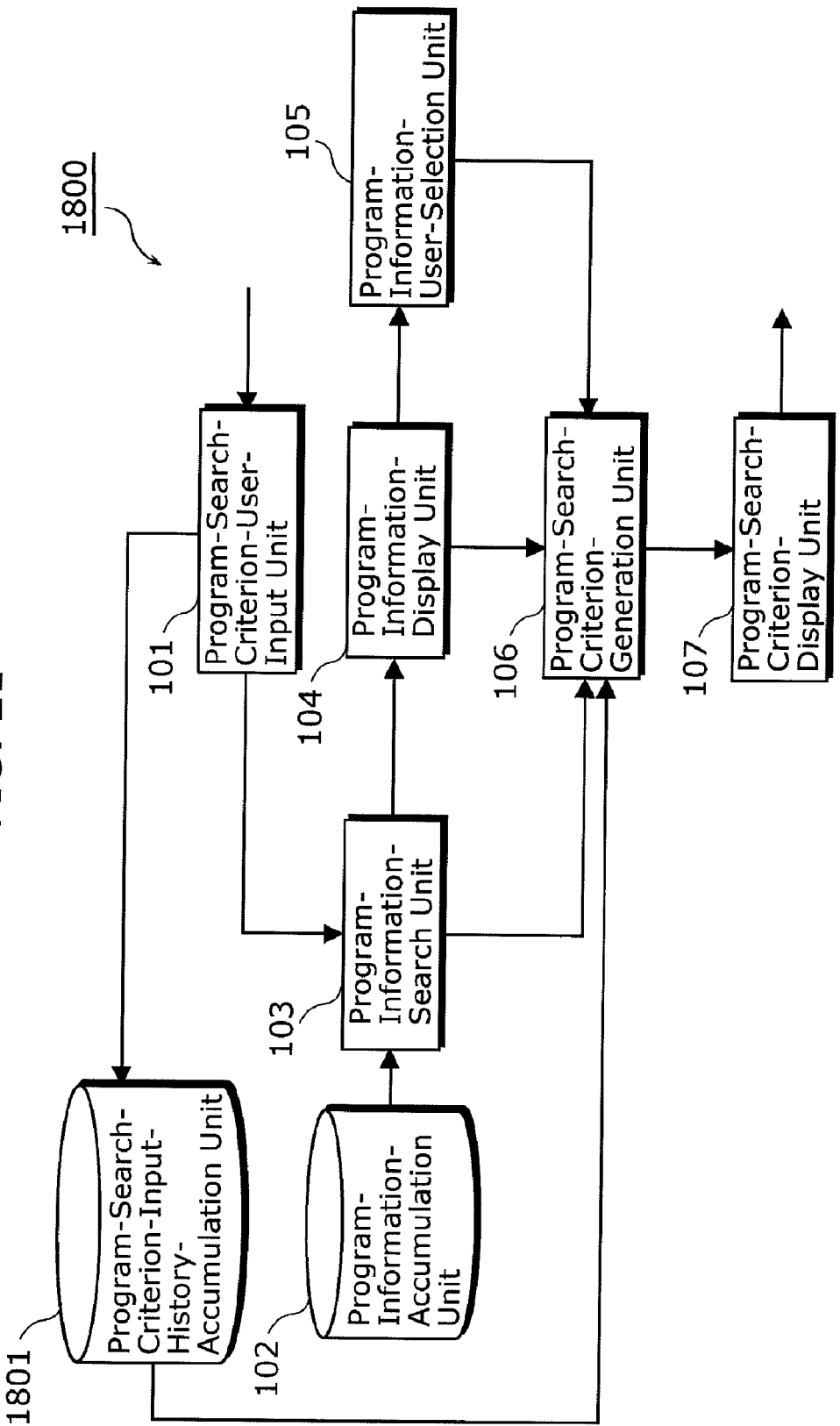
FIG. 21 is a block diagram showing a structure of a program retrieval support device according to a second embodiment.

FIG. 21 is a block diagram showing a structure of the program retrieval support device according to the second embodiment. As shown in FIG. 21, the same reference numerals of the units in the first embodiment are assigned to the identical units in the second embodiment, so that the identical units are not explained again below. The program retrieval support device 1800, which has a system structure different from the structure in the first embodiment, differs from the program retrieval support device in the first embodiment in that inputs of the program-search-criterion-user-input unit 101 are accumulated in a program-search-criterion-input-history-accumulation unit 1801. Moreover, the program-search-criterion-display unit 107 presents a plurality of new search criterion candidates, and the user uses the program-search-criterion-user-input unit 101 to input a search criterion selected from the presented candidates. This input is also accumulated in the program-search-criterion-input-history-accumulation unit 1801. Furthermore, a degree of change in user's search intent is detected from the history accumulated in the program-search-criterion-input-history-accumulation unit 1801 using a distance from a previous search criterion. Then, depending on the change degree, search criteria generated by the program-search-criterion-generation unit 106 are changed. In the second embodiment, how the program-search-criterion-generation unit 106 generates search criteria depending on data of the program-search-criterion-input-history-accumulation unit 1801 is mainly described.

The program-search-criterion-input-history-accumulation unit 1801 accumulates (i) a search criterion inputted by the user using the program-search-criterion-user-input unit 101 and (ii) a result of search using the search criterion, in association with each other. FIG. 22 is a table showing an example of a history of search criteria accumulated in the program-search-criterion-input-history-accumulation unit 1801. In FIG. 22, (i) a keyword as a search criterion, (ii) program IDs of programs found by the keyword, and (iii) the number of the programs are accumulated in a table. For example, in the case of K001, programs found by a search keyword "sports" are P001, P003, ... which are totally 122 programs. It is also shown that the found programs are narrowed down using a keyword "baseball" and then the user learns that 89 accumulated programs are found by the narrowing down. As described above, the checking of a history of search keywords for programs can provide an indicator to determine whether or not the user attempts to narrow down the search results or the user changes an interest for search. In the second embodiment, a technique of generating next search criteria using such a history of search criteria is described.

Figure 23:
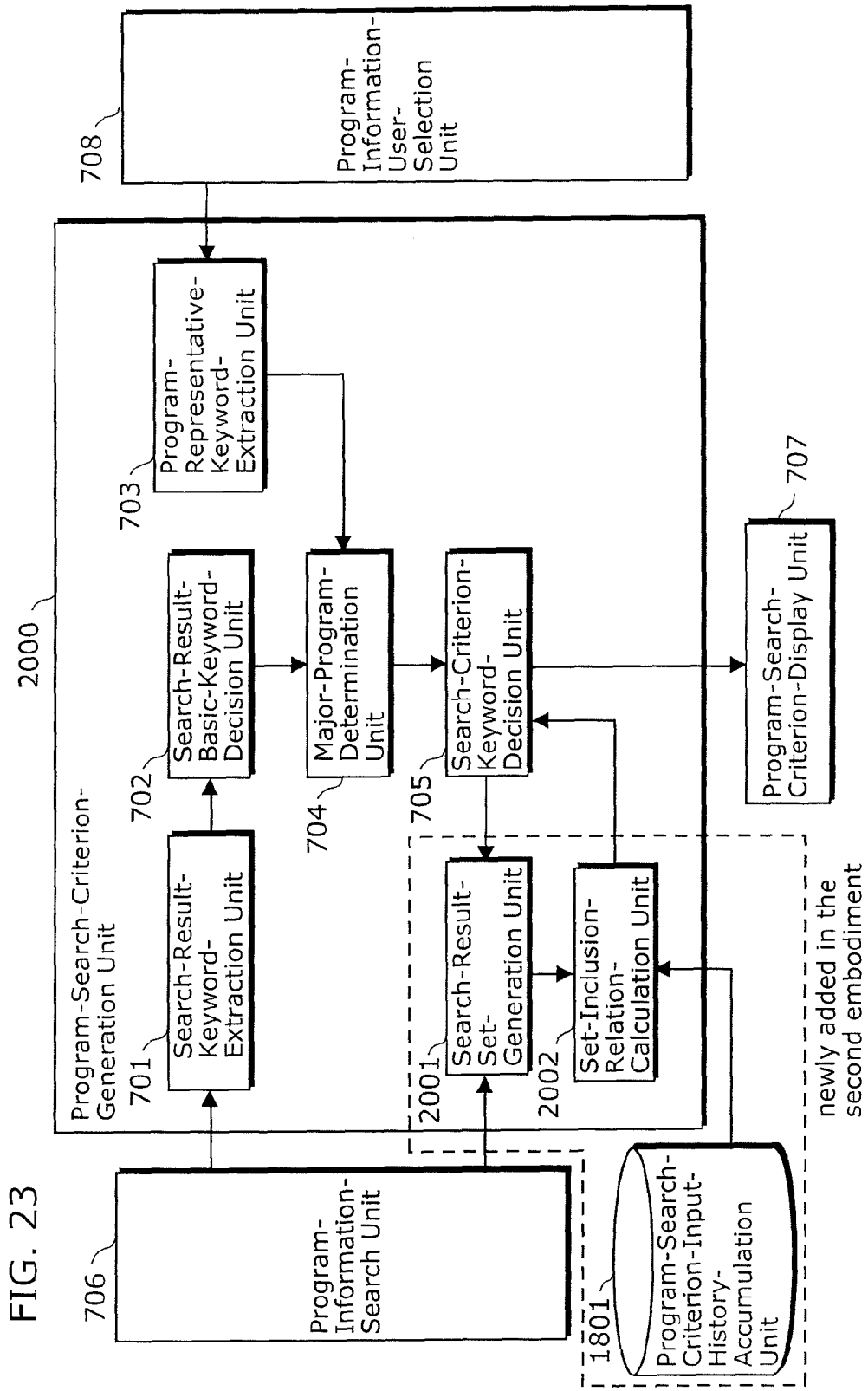
FIG. 23 is a block diagram showing a structure of a program-search-criterion-generation unit for performing processing in the program retrieval support device.

FIG. 23 is a block diagram showing a structure of a program-search-criterion-generation unit 2000 for performing processing in the program retrieval support device 1800. As shown in FIG. 23, the program-search-criterion-generation unit 2000 of the second embodiment differs from the program-search-criterion-generation unit of the first embodiment in adding a program-search-criterion-input-history-accumulation unit 1801, a search-result-set-generation-unit 2001, and a set-inclusion-relation-calculation unit 202. The following describes processing performed by each of the units. The program-search-criterion-input-history-accumulation unit 1801 is an example of "a program-search-criteria-input-history-accumulation unit in which (i) search criteria which have been received by the search-criterion-input unit and (ii) respective search results using the search criteria are accumulated" in the aspect of the present invention.

The search-result-set-generation-unit 2001 generates a set of program IDs satisfying a search criterion inputted by the user. For example, in FIG. 22, program IDs are associated with a keyword for search (search keyword), and a set of results of the search is generated. Here, the search-result-set-generation-unit 2001 receives a search keyword decided by the search-criterion-keyword-decision unit 705, and then returns a result of search using the keyword.

Figure 24:
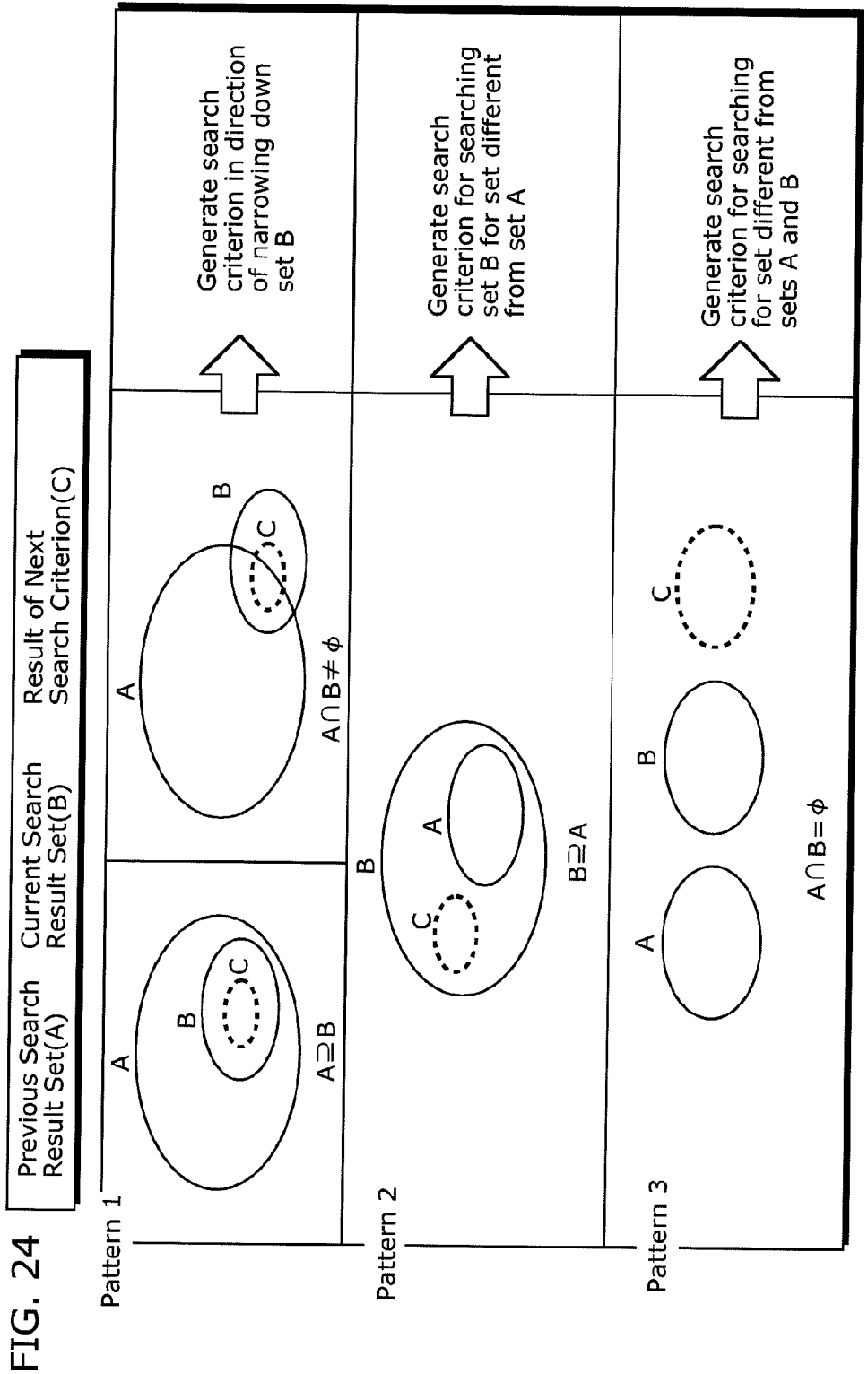
FIG. 24 is a diagram showing an example of a situation where a set-inclusion-relation-calculation unit (a) compares a set A consisting of previous search results with a set B consisting of current search results and (b) thereby changes processing of the search-criterion-keyword-generation unit depending on a result of the comparison.

The set-inclusion-relation-calculation unit 2002 is an example of "a set-inclusion-relation-calculation unit that calculates an inclusion relation between (i) a set of the respective search results accumulated in the program-search-criteria-input-history-accumulation unit and (ii) a set of the found pieces of program information which are search results using the search criterion that is currently received by the search-criterion-input unit" in the aspect of the present invention. The set-inclusion-relation-calculation unit 2002 compares (i) a set of program IDs generated by the search-result-set-generation-unit 2001 with (ii) a set of program IDs found by search using a previous search keyword, thereby calculating an inclusion relation between the sets. Furthermore, as shown in FIG. 24, processing performed by the search-criterion-keyword-decision unit 705 to generate new search criteria is changed depending on the inclusion relation between the sets. Here, the search-criterion-keyword-decision unit 705 is an example of "the program-search-criterion-generation unit that generates the new search criterion based on the inclusion relation calculated by the set-inclusion-relation-calculation unit" in the aspect of the present invention. FIG. 24 is a diagram showing an example of a situation where the set-inclusion-relation-calculation unit 2002 (a) compares a set A consisting of previous search results (hereinafter, also as a "previous search result set A") with a set B consisting of current search results (hereinafter, also as a "current search result set B") and (b) thereby changes processing of the search-criterion-keyword-decision unit 705 depending on a result of the comparison. In FIG. 24, for example, "A" denotes information of a set of programs that are previous search results, and "B" denotes information of a set of programs that are current search results. Moreover, "C" denotes a set of search results to be presented to the user as next search criteria. For example, in the case of a relation shown as Pattern 1 in FIG. 24, the previous search is performed by "sports" and the current search is performed by "baseball". Therefore, the previous search result set A includes the current search result set B. It is understood that this is because the user attempts to narrow down pieces of program information by more specifying a search criterion. Therefore, next search criteria to be presented are search keywords, such as "Matsui", which are keywords in the current search result set B and by which the pieces of program information can be narrowed down. Furthermore, when in an example shown at the right portion of Pattern 1 in FIG. 24 there is an intersection between the set of the previous search results and the set of the current search results, search keywords for narrowing down the current search result set B are presented. The search-criterion-keyword-decision unit 705 is an example of "the program-search-criterion-generation unit that generates the new search criterion by extracting a keyword from a piece of text information in the selection piece of program information, when the inclusion relation calculated by the set-inclusion-relation-calculation unit shows that (i) the set of the respective search results includes (ii) the set of the found pieces of program information" in the aspect of the present invention.

Next, in the case of Pattern 2 in FIG. 24, when a search criterion used for previous search is a keyword such as "baseball", a search criterion used for current search is a keyword such as "sports", and the number of search results of the current search is more than that of the previous search, then it is determined that the user is attempting to search for other search results in the genre "sports". Thereby, the user is presented with keywords as search criteria, such as "tennis" and "soccer", which do not include "baseball" among keywords regarding "sports", so that a part of the current search result set B that is not included in the previous search result set A can be searched for. Here, the search-criterion-keyword-decision unit 705 is an example of "the program-search-criterion-generation unit that generates the new search criterion by extracting a keyword from pieces of text information in the pieces of program information except the found pieces of program information displayed by the program-information-display unit, when the inclusion relation calculated by the set-inclusion-relation-calculation unit shows that (ii) the set of the found pieces of program information displayed by the program-information-display unit includes (i) the set of the respective search results" in the aspect of the present invention.

Furthermore, in the case of Pattern 3 in FIG. 24, when there is no intersection between (i) a search result set obtained using the previous search criterion "baseball" and (ii) a search result set obtained using the current search criterion "idol", new search criterion keywords such as "economics" are presented as search keywords that include neither "baseball" nor "idol".

The above has described the system that (a) beforehand searches for a search result set obtained using a next search criterion based on an inclusion relation between (i) a set of programs found using a current search criterion and (ii) a set of programs found using a previous search criterion, and (b) thereby presents the user with search criteria. Thereby, it is possible to propose the user with search criteria in consideration of a direction (intent) of user's search.

The search-criterion-keyword-decision unit 705 in the second embodiment decides keywords for narrowing down search results in the same manner as described in the first embodiment. However, the search-criterion-keyword-decision unit 705 in the second embodiment also determines whether or not the each of the decided keyword is appropriate, based on an inclusion relation between (i) a search result set obtained using a previous search criterion and (ii) a search result set obtained using a current search criterion which is calculated by the set-inclusion-relation-calculation unit 2002.

Figure 25:
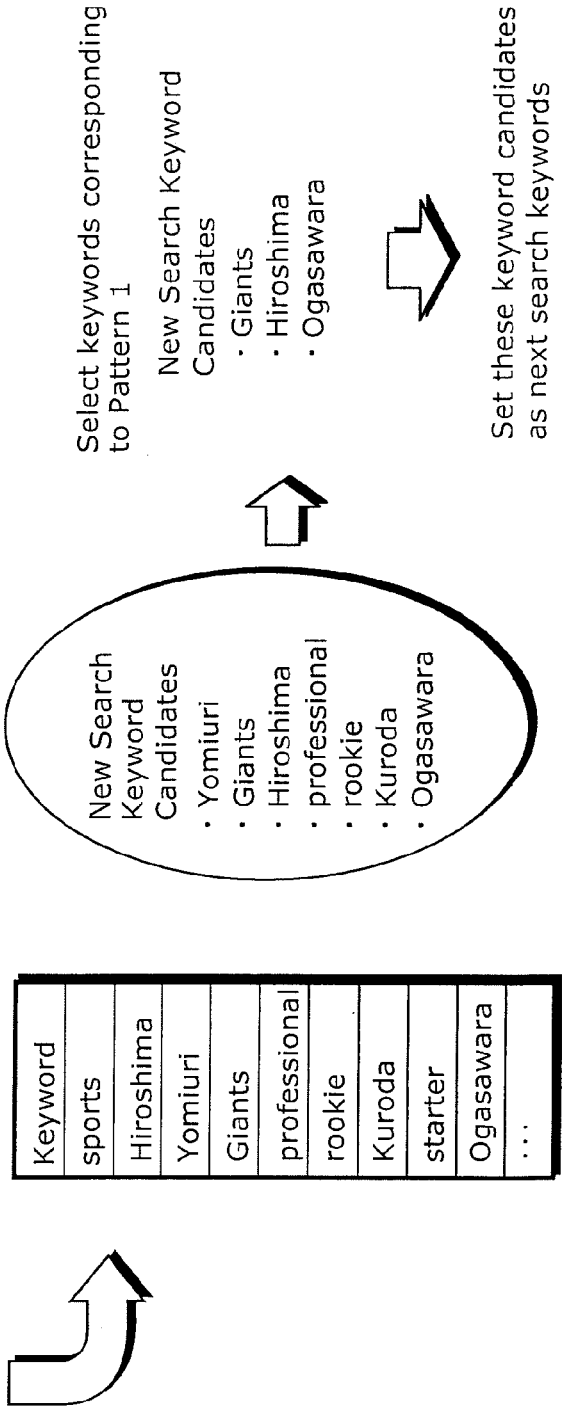
FIG. 25 is a diagram showing an example of generating search criteria by the search-criterion-keyword-generation unit when the set A consisting of previous search results and the set B consisting of current search results belong to Pattern 1 shown in FIG. 24.

The following describes the situation where an inclusion relation regarding search results is calculated as Pattern 1 in FIG. 24, for example. When a previous search criterion is "sports" and a current search criterion is "baseball", an inclusion relation between their search result sets is that the current search result set is included in the previous search result set. Therefore, the inclusion relation is determined as Patten 1. Then, as described also in the first embodiment, keywords are extracted from text information regarding a program selected by the user. In this situation, keywords such as "sports", "Hiroshima", "Yomiuri", and "Giants" are extracted. FIG. 25 is a diagram showing an example of generating search criteria by the search-criterion-keyword-generation unit 705 when (i) the set A consisting of previous search results (namely, the previous search result set A) and (ii) the set B consisting of current search results (namely, the current search result set B) belong to Pattern 1 in FIG. 24. Here, since the current search result set is Pattern 1, keywords are to be extracted so that a search result set obtained using each of the keywords is included in a search result set obtained using "baseball". Therefore, program search is temporarily performed using each of keyword candidates to be presented next, and then a keyword appearing predetermined times in the search result set obtained using "baseball" is selected. As a result, search keywords such as "Giants", "Hiroshima", and "Ogasawara" are presented as next search criterion keywords. As described above, the keywords for narrowing down which are described in the first embodiment are further selectively reduced using an inclusion relation between past search results.

Figure 26:
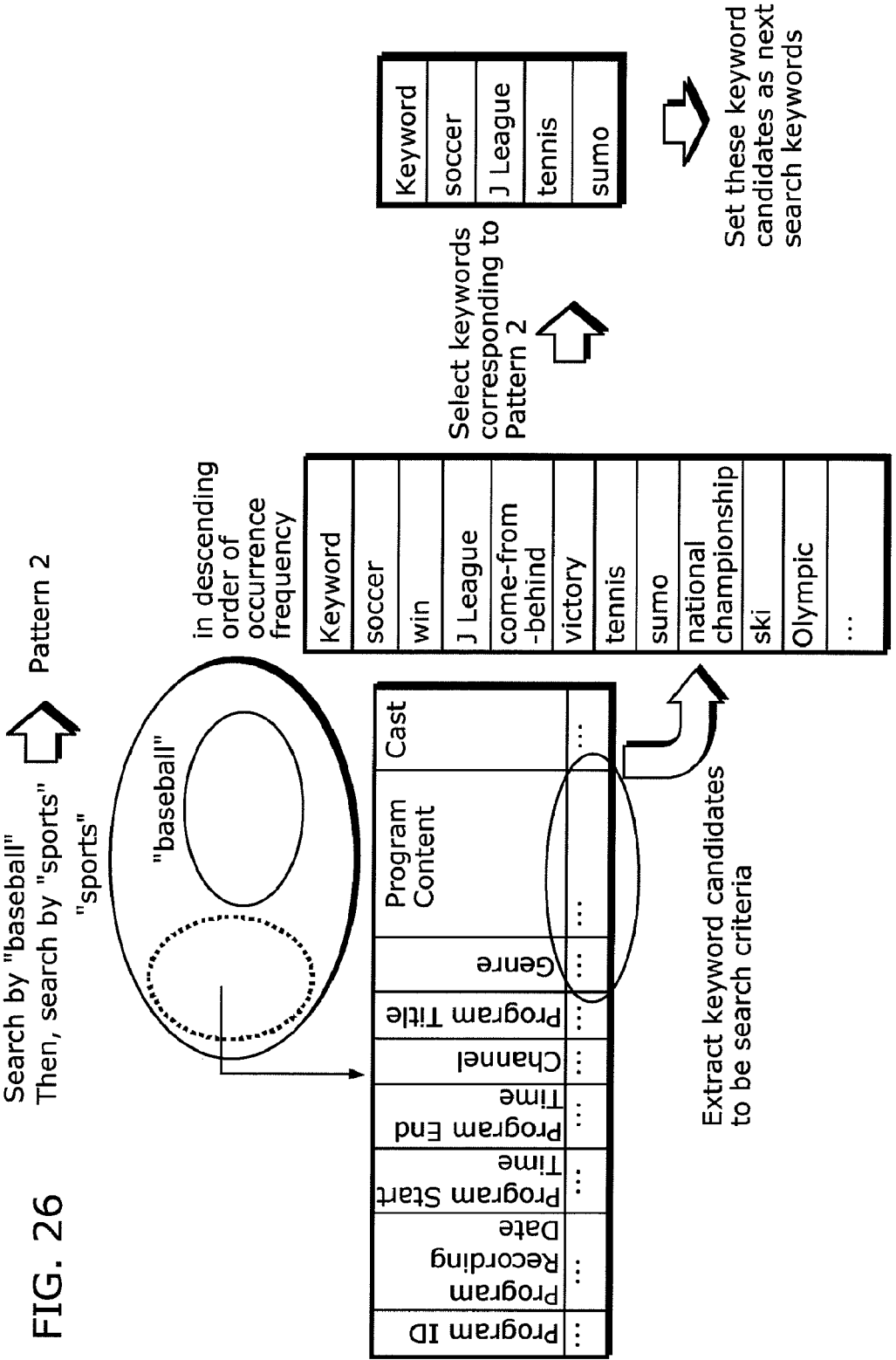
FIG. 26 is a diagram showing an example of generating search criteria by the search-criterion-keyword-generation unit when the set A consisting of previous search results and the set B consisting of current search results belong to Pattern 2 shown in FIG. 24.

For another example, the following describes the situation where an inclusion relation regarding search results is calculated as Pattern 2 in FIG. 24. FIG. 26 is a diagram showing an example of generating search criteria by the search-criterion-keyword-generation unit 705 when (i) the set A consisting of previous search results (namely, the previous search result set A) and (ii) the set B consisting of current search results (namely, the current search result set B) belong to Pattern 2 shown in FIG. 24. Here, described is the situation where search using "baseball" is performed and then search using "sports" is performed, which is opposite of the previous example. In this situation, a calculated inclusion relation is that the current search result set includes the previous search result set, which is opposite of the case of Pattern 1. Therefore, as shown in FIG. 26, a set of programs (program set) that is included in the search result set obtained using "sports" but not included in the search result set obtained using "baseball" is selected. Then, keywords having higher occurrence frequency are extracted from text information of genres or description regarding the program set. For the keywords, keywords such as "soccer", "victory", "J League", and "come-from-behind" are extracted. Then, program search is performed using each of the keywords. The number of common programs between (i) a search result set obtained using each keyword and (ii) a search result set obtained using "baseball" is calculated. If the number is equal to or more than a predetermined value, the keyword is excluded from new search keyword candidates. This is because search using such a keyword results in presenting the same programs (the same search results) as those of the previous search. Therefore, for keywords for obtaining search results different from previous search results, "soccer", "J League", and "tennis" are selected. As described above, keywords as new search criteria are presented using an inclusion relation with a past search result set.

Figure 27:
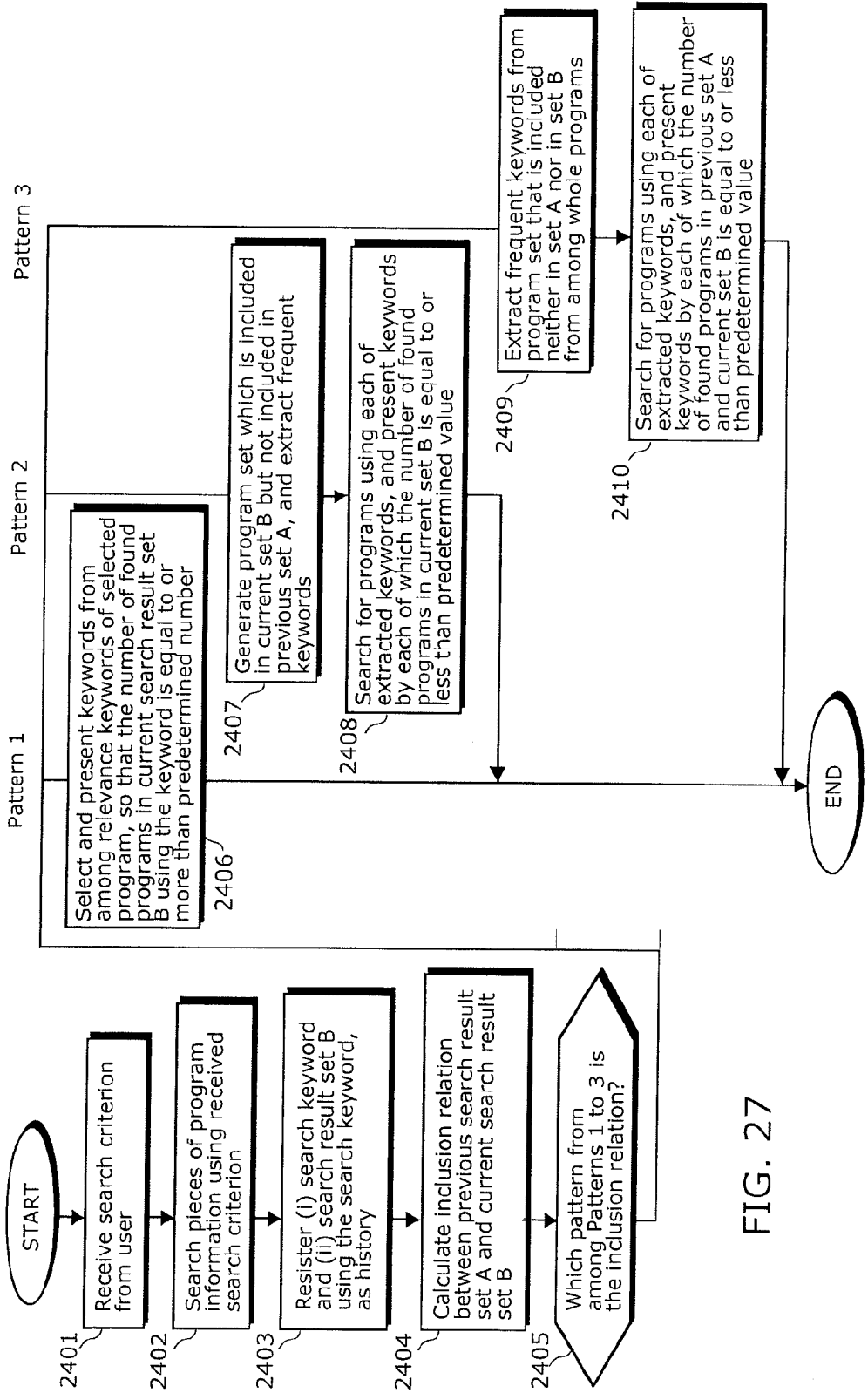
FIG. 27 is a flowchart of processing performed by the program-search-criterion-generation unit to generate a different set of search criteria depending on data in a program-search-criterion-input-history-accumulation unit.

The above processing is shown in a flowchart of FIG. 27. FIG. 27 is a flowchart of the processing performed by the program-search-criterion-generation unit 106 to generate a different set of search criteria depending on data in the program-search-criterion-input-history-accumulation unit 1801. In FIG. 27, the user inputs a search criterion using the program-search-criterion-user-input unit 101 (Step 2401). Using the input search criterion, the program-information-search unit 103 searches pieces of program information accumulated in the program-information-accumulation unit 102 (Step 2402). A keyword as the search criterion and search results obtained using the keyword are registered and accumulated in the program-search-criterion-input-history-accumulation unit 1801 (Step 2403). The set-inclusion-relation-calculation unit 2002 calculates an inclusion relation between (i) a previous search result set A and (ii) a current search result set B (Step S2404). Based on a result of the calculation, the search-criterion-keyword-decision unit 705 determines which pattern from among the three patterns in FIG. 24 the calculated inclusion relation is (Step 2405). If the calculated inclusion relation is Pattern 1, relevance keywords are extracted from text information regarding a selected program, and then it is determined for each of the relevance keywords whether or not the number of programs which are found using the keyword and also included in the current search result set B is equal to or more than a predetermined number (Step 2406). If the number of found programs is equal to or more than the predetermined number, the keyword is presented to the user as a keyword which is generated from the program selected by the user to narrow down the current search result set B. If the calculated inclusion relation is Pattern 2, a program set is generated to be included in the current search result set B but not in the previous search result set A, and then keywords having higher occurrence frequency are extracted from text information regarding the generated program set (Step 2407). From among the keywords extracted at step 2407, keywords by each of which the number of programs which are found by the keyword and also included in the current search result set A is equal to or less than a predetermined value are presented as keywords to be next search criteria (Step 2408). On the other hand, if the calculated inclusion relation is Pattern 3, a program set is generated from the programs accumulated in the program-information-accumulation unit 102 to be included neither in the previous search result set A nor in the current search result set B, and then keywords having higher occurrence frequency are extracted from the generated program set (Step 2409). Each of the extracted keywords is used to search programs beforehand, and keywords by each of which the number of programs which are found by the keyword and also included in the previous search result set A and the current search result set B is equal to or less than a predetermined value are presented as keywords to be next search criteria.

The above processing makes it possible to present the user with keywords as new search criteria using an inclusion relation with a search result set obtained using a past search keyword. As a result, all the user needs to do is selecting one of the presented keywords to search programs.

It should be noted that in the embodiments new search criteria are keywords. However, since the program retrieval support device according to the present invention searches pieces of program information, it is also possible to search programs (pieces of program information) using information of a broadcast time or a broadcast date. Therefore, in the first embodiment, major keywords are extracted from found programs, and then it is determined whether or not a program selected by the user includes the major keywords, thereby determining whether or not the selected program is a major program. Then, based on a result of the determination, next search criteria are changed. On the other hand, when pieces of program information are to be searched for, the programs (the pieces of program information) found by the search are assigned with attribute of broadcast start times. Therefore, a major time zone can be extracted by determining in which time zone a set of found programs have been recorded. Furthermore, it is also possible that, if a program selected by the user is recorded in the major time zone, search criteria for narrowing search results are presented, and if the program selected by the user is recorded in a time zone different from the major time zone, search criteria for extending search results are presented.

Figure 28:
FIG. 28 (a) is a table showing broadcast start times of programs that are search results obtained using a genre "sports".

FIG. 28 (a) is a table showing broadcast start times of programs that are search results obtained using a genre "sports". FIG. 28 (b) is a table showing how many programs that are the search results obtained using the genre "sports" are included in each broadcast start time zone. For example, as shown in FIG. 28 (b), the number of found programs in each time zone is calculated using values of broadcast start times of the programs shown in FIG. 28 (a). Then, top three time zones with more programs are extracted, and the time zones are set as search result basic time zones. FIG. 29 (a) is a table showing an example of search criteria when a program pointed from among search results obtained using a genre "sports" is included in a search result basic time zone. FIG. 29 (b) is a diagram showing an example of search criteria when the program pointed from among search results obtained using the genre "sports" is not included in a search result basic time zone. Next, as shown in FIGS. 29 (a) and (b), the program-search-criterion-generation unit determines whether or not a broadcast start time (program start time) of the program selected by the user is included in a search result basic time zone detected in the above-described manner. In the case of FIG. 29 (a), since the broadcast start time (program start time) is 19:30, the broadcast start time of the program is included in the search result basic time zone. In this case, search criterion for narrowing down search results (programs) in the time zone is presented. On the other hand, as shown in FIG. 29 (b), when the broadcast start time (program start time) is 7:00, the broadcast start time of the program is not included in the search result basic time zone. The program-search-criterion-generation unit determines that the user is interested in such a program because the user desires a program set different from the currently found program set. Therefore, the program-search-criterion-generation unit presents search criteria of different genres or search criteria generated from a different point of view, as next search criteria. FIG. 30 (a) is a diagram showing an example of search criteria presented when a broadcast start time of a pointed program is included in a search result basic time zone. FIG. 30 (b) is a diagram showing an example of search criteria presented when the broadcast start time of the pointed program is not included in the search result basic time zone. As a result of the above, as shown in FIGS. 30 (a) and (b), based on a broadcast start time zone of the program selected by the user, it is possible to change next search criteria generated based on the same program set (search results).

It should be noted that functional blocks in the block diagrams (FIGS. 1, 2, 7, 13, 21, and 23, for example) are typically implemented into a LSI which is an integrated circuit. These may be integrated separately, or a part or all of them may be integrated into a single chip. For example, functional blocks except a memory may be integrated into a single chip.

Here, the integrated circuit is referred to as a LSI, but the integrated circuit can be called an IC, a system LSI, a super LSI or an ultra LSI depending on their degrees of integration.

It should also be noted that the technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

It should also be noted that only a means (not shown) for storing data to be coded or decoded, among these functional blocks, may be realized as another structure, without being integrated into the single chip.

INDUSTRIAL APPLICABILITY

The present invention can be used to dialogically search programs in a terminal such as a recording apparatus, a television set, or a personal computer. The present invention is highly suitable for practical use, as a technology of achieving a function of supporting searching programs.

The invention claimed is:

1. A program retrieval support device that searches accumulated TV programs for a TV program, said program retrieval support device comprising:
   a program-information-accumulation unit including a memory in which pieces of program information are accumulated, each respective piece of program information being related to a corresponding TV program;
   a search-criterion-input unit configured to receive, from a user, a search criterion for a program search;
   a program-information-search unit configured to search the pieces of program information accumulated in said program-information-accumulation unit, using the search criterion received by said search-criterion-input unit;
   a program-information-display unit configured to display found pieces of program information in a list, the found pieces of program information being found by the search performed by said program-information-search unit;
   a program-information-user-selection unit configured to receive, from the user, an input of selecting a selection piece of program information from the found pieces of program information displayed in the list by said program-information-display unit, such that the selection piece of program information is selected using the input received by said program-information-user-selection unit;
   a major-program-determination unit configured to (i) determine whether or not the selection piece of program information has a commonality with the found pieces of program information found by said program-information-search unit, based on a common keyword included in (a) a program representative keyword set and (b) a search result basic keyword set, the program representative keyword set consisting of words included in the selection piece of program information, and the search result basic keyword set consisting of words selected from words included in the found pieces of program information, and (ii) determine, based on a result of the determination regarding the commonality, whether or not a TV program corresponding to the selection piece of program information is a major program;
   a program-search-criterion-generation unit configured to generate a new search criterion for narrowing down the found pieces of program information to be more similar to the selection piece of program information, when said major-program-determination unit determines that the TV program corresponding to the selection piece of program information is the major program; and a program-search-criterion-display unit configured to display, to the user, the new search criterion generated by said program-search-criterion-generation unit, the new search criterion being used as a search criterion candidate for the user to potentially be received by said search-criterion-input unit as a next search criterion for further program search, wherein said major-program-determination unit is configured to determine that the TV program corresponding to the selection piece of program information is a major program, when the program representative keyword set includes the search result basic keyword set and there are a predetermined number or more of common keywords between the program representative keyword set and the search result basic keyword set.

2. The program retrieval support device according to claim 1, wherein said program-search-criterion-generation unit includes:
- a search-result-basic-keyword-extraction unit configured to extract the search result basic keyword set from the words included in the found pieces of program information; and
- a program-representative-keyword-extraction unit configured to extract the program representative keyword set from the words included in the selection piece of program information, and wherein said major-program-determination unit is configured to determine that the TV program corresponding to the selection piece of program information is the major program, when at least one keyword of the search result basic keyword set is included in the program representative keyword set, the at least one keyword of the search result basic keyword set appearing a predetermined number of times or more in the words included in the found pieces of program information.

3. The program retrieval support device according to claim 2, wherein said program-search-criterion-generation unit is configured to generate the new search criterion by extracting one keyword of the program representative keyword set to be used as the search criterion candidate, when said major-program-determination unit determines that the TV program corresponding to the selection piece of program information is the major program.

4. The program retrieval support device according to claim 3, wherein said program-search-criterion-generation unit is configured to generate the next search criterion using an AND combination between the search result basic keyword set and the program representative keyword set, when said major-program-determination unit determines that the TV program corresponding to the selection piece of program information is the major program, and the program representative keyword set is used to search a different genre.

5. The program retrieval support device according to claim 1, wherein said program-search-criterion-generation unit is configured to generate (i) a keyword extracted from the program representative keyword set and (ii) a keyword related to a genre different from a genre of the TV program corresponding to the selection piece of program information, when said major-program-determination unit determines that the TV program corresponding to the selection piece of program information is not the major program.

6. The program retrieval support device according to claim 1, wherein said major-program-determination unit is configured to determine whether or not the TV program corresponding to the selection piece of program information is the major program, using (i) a term frequency-inverse document frequency (TF-IDF) value of a keyword included in the found pieces of program information within the pieces of program information accumulated in said program-information-accumulation unit and (ii) a TF-IDF value of a keyword included in the selection piece of program information within the found pieces of program information.

7. The program retrieval support device according to claim 1, wherein said major-program-determination unit is configured to determine whether or not the selection piece of program information has the commonality with the found pieces of program information, using a date and a time of broadcasting or recording the TV program corresponding to the selection piece of program information.

8. The program retrieval support device according to claim 1, further comprising:
- a program-search-criteria-input-history-accumulation unit in which (i) search criteria received by said search-criterion-input unit and (ii) respective search results based on the search criteria are accumulated; and
- a set-inclusion-relation-calculation unit configured to calculate an inclusion relation between (i) a set of the respective search results accumulated in said program-search-criteria-input-history-accumulation unit and (ii) a set of the found pieces of program information, which are search results based on the search criterion currently received by said search-criterion-input unit, wherein said program-search-criterion-generation unit is configured to generate the new search criterion based on the inclusion relation calculated by said set-inclusion-relation-calculation unit.

9. The program retrieval support device according to claim 8, wherein said program-search-criterion-generation unit is configured to generate the new search criterion by extracting a keyword from a piece of text information in the selection piece of program information, when the inclusion relation calculated by said set-inclusion-relation-calculation unit shows that the set of the respective search results includes the set of the found pieces of program information.

10. The program retrieval support device according to claim 8, wherein said program-search-criterion-generation unit is configured to generate the new search criterion by extracting a keyword from pieces of text information in the pieces of program information, except the found pieces of program information displayed in the list by said program-information-display unit, when the inclusion relation calculated by said set-inclusion-relation-calculation unit shows that the set of the found pieces of program information displayed in the list by said program-information-display unit includes the set of the respective search results.

11. A program retrieval support device that searches accumulated TV programs for a TV program, said program retrieval support device comprising:
- a program-information-accumulation unit including a memory in which pieces of program information are accumulated, each respective piece of program information being related to a corresponding TV program;
- a search-criterion-input unit configured to receive, from a user, a search criterion for a program search;
- a program-information-search unit configured to search the pieces of program information accumulated in said program-information-accumulation unit, using the search criterion received by said search-criterion-input unit;
- a program-information-display unit configured to display found pieces of program information in a list, the found pieces of program information being found by the search performed by said program-information-search unit;

a program-information-user-selection unit configured to receive, from the user, an input of selecting a selection piece of program information from the found pieces of program information displayed in the list by said program-information-display unit, such that the selection piece of program information is selected using the input received by said program-information-user-selection unit;

a major-program-determination unit configured to (i) determine whether or not the selection piece of program information has a commonality with the found pieces of program information found by said program-information-search unit, based on a common keyword included in (a) a program representative keyword set and (b) a search result basic keyword set, the program representative keyword set consisting of words included in the selection piece of program information, and the search result basic keyword set consisting of words selected from words included in the found pieces of program information, and (ii) determine, based on a result of the determination regarding the commonality, whether or not a TV program corresponding to the selection piece of program information is a major program;

a program-search-criterion-generation unit configured to generate a new search criterion for narrowing down the found pieces of program information to be more similar to the selection piece of program information, when said major-program-determination unit determines that the TV program corresponding to the selection piece of program information is the major program;

a program-search-criterion-display unit configured to display, to the user, the new search criterion generated by said program-search-criterion-generation unit, the new search criterion being used as a search criterion candidate for the user to potentially be received by said search-criterion-input unit as a next search criterion for further program search;

a program-search-criteria-input-history-accumulation unit in which (i) search criteria received by said search-criterion-input unit and (ii) respective search results based on the search criteria are accumulated; and a set-inclusion-relation-calculation unit configured to calculate an inclusion relation between (i) a set of the respective search results accumulated in said program-search-criteria-input-history-accumulation unit and (ii) a set of the found pieces of program information, which are search results based on the search criterion currently received by said search-criterion-input unit, wherein said program-search-criterion-generation unit is configured to generate the new search criterion based on the inclusion relation calculated by said set-inclusion-relation-calculation unit, and wherein said major-program-determination unit is configured to determine that the TV program corresponding to the selection piece of program information is a major program, when the program representative keyword set includes the search result basic keyword set and there are a predetermined number or more of common keywords between the program representative keyword set and the search result basic keyword set.

12. A program retrieval support method of searching accumulated TV programs for a TV program using a program-information-accumulation unit including a memory in which pieces of program information are accumulated, each respective piece of program information being related to a corresponding TV program, said program retrieval support method comprising:

receiving, by a search-criterion-input unit and from a user, a search criterion for a program search;

searching, by a program-information-search unit, the pieces of program information accumulated in the program-information-accumulation unit, using the search criterion received by said receiving of the search criterion;

displaying, by a program-information-display unit, found pieces of program information in a list, the found pieces of program information being found by said searching;

receiving, by a program-information-user-selection unit and from the user, an input of selecting a selection piece of program information from the found pieces of program information displayed in the list by said displaying, such that the selection piece of program information is selected using the input received by said receiving of the input;

determining, by a major-program-determination unit, (i) whether or not the selection piece of program information has a commonality with the found pieces of program information found by said searching, based on a common keyword included in (a) a program representative keyword set and (b) a search result basic keyword set, the program representative keyword set consisting of words included in the selection piece of program information, and the search result basic keyword set consisting of words selected from words included in the found pieces of program information found by said searching, and (ii), based on a result of the determination regarding the commonality, whether or not a TV program corresponding to the selection piece of program information is a major program;

generating, by a program-search-criterion-generation unit, a new search criterion for narrowing down the found pieces of program information to be more similar to the selection piece of program information, when said determining determines that the TV program corresponding to the selection piece of program information is the major program; and displaying to the user, by a program-search-criterion-display unit, the new search criterion generated by said generating of the new search criterion, the new search criterion being used as a search criterion candidate for the user to potentially be received by said receiving of the search criterion as a next search criterion for further program search, wherein the determining further includes determining that the TV program corresponding to the selection piece of program information is a major program, when the program representative keyword set includes the search result basic keyword set and there are a predetermined number or more of common keywords between the program representative keyword set and the search result basic keyword set.

13. A non-transitory computer-readable recording medium having a computer program recorded thereon, the computer program for use in a program retrieval support device that searches accumulated TV programs for a TV program and includes a program-information-accumulation unit in which pieces of program information are accumulated, each respective piece of program information being related to a corresponding TV program, said computer program causing a computer to execute a method comprising:

receiving, from a user, a search criterion for a program search;

searching the pieces of program information accumulated in the program-information-accumulation unit, using the search criterion received by said receiving of the search criterion;

displaying found pieces of program information in a list, the found pieces of program information being found by said searching;

receiving, from the user, an input of selecting a selection piece of program information from the found pieces of program information displayed in the list by said displaying, such that the selection piece of program information is selected using the input received by said receiving of the input;

determining (i) whether or not the selection piece of program information has a commonality with the found pieces of program information found by said searching, based on a common keyword included in (a) a program representative keyword set and (b) a search result basic keyword set, the program representative keyword set consisting of words included in the selection piece of program information, and the search result basic keyword consisting of words selected from words included in the found pieces of program information found by said searching, and (ii), based on a result of the determination regarding the commonality, whether or not a TV program corresponding to the selection piece of program information is a major program;

generating a new search criterion for narrowing down the found pieces of program information to be more similar to the selection piece of program information, when said determining determines that the TV program corresponding to the selection piece of program information is the major program; and displaying, to the user, the new search criterion generated by said generating of the new search criterion, the new search criterion being used as a search criterion candidate for the user to potentially be received by said receiving of the search criterion as a next search criterion for further program search, wherein the determining further includes determining that the TV program corresponding to the selection piece of program information is a major program, when the program representative keyword set includes the search result basic keyword set and there are a predetermined number or more of common keywords between the program representative keyword set and the search result basic keyword set.

14. A content search support device that searches accumulated contents for a content, said content search support device comprising:

a content-information-accumulation unit including a memory in which pieces of content information are accumulated, each respective piece of content information being related to a corresponding content;

a search-criterion-input unit configured to receive, from a user, a search criterion for a content search;

a content-information-search unit configured to search the pieces of content information accumulated in said content-information-accumulation unit, using the search criterion received by said search-criterion-input unit;

a content-information-display unit configured to display found pieces of content information in a list, the found pieces of content information being found by the search performed by said content-information-search unit;

a content-information-user-selection unit configured to receive, from the user, an input of selecting a selection piece of content information from the found pieces of content information displayed in the list by said content-information-display unit, such that the selection piece of content information is selected using the input received by said content-information-user-selection unit;

a major-content-determination unit configured to (i) determine whether or not the selection piece of content information has a commonality with the found pieces of content information found by said content-information-search unit, based on a common keyword included in (a) a program representative keyword set and (b) a search result basic keyword set, the program representative keyword set consisting of words included in the selection piece of content information, and the search result basic keyword set consisting of words selected from words included in the found pieces of content information, and (ii) determine, based on a result of the determination regarding the commonality, whether or not a content corresponding to the selection piece of program information is a major content;

a content-search-criterion-generation unit configured to generate a new search criterion for narrowing down the found pieces of content information to be more similar to the selection piece of content information, when said major-content-determination unit determines that the content corresponding to the selection piece of content information is the major content; and a content-search-criterion-display unit configured to display, to the user, the new search criterion generated by said content search-criterion-generation unit, the new search criterion being used as a search criterion candidate for the user to potentially be received by said search-criterion-input unit as a next search criterion for further content search, wherein said major-content-determination unit is configured to determine that the content corresponding to the selection piece of program information is a major content, when the program representative keyword set includes the search result basic keyword set and there are a predetermined number or more of common keywords between the program representative keyword set and the search result basic keyword set.

* * * * *